Sept. 17, 1940.  E. E. HEWITT  2,215,356
VEHICLE BRAKE AND MOTOR CONTROL SYSTEM
Filed July 28, 1939  11 Sheets-Sheet 1

INVENTOR
ELLIS E. HEWITT
BY
ATTORNEY

Sept. 17, 1940.　　　　　　E. E. HEWITT　　　　　　2,215,356
VEHICLE BRAKE AND MOTOR CONTROL SYSTEM
Filed July 28, 1939　　　11 Sheets-Sheet 2

INVENTOR
ELLIS E. HEWITT
BY
ATTORNEY

Sept. 17, 1940.   E. E. HEWITT   2,215,356
VEHICLE BRAKE AND MOTOR CONTROL SYSTEM
Filed July 28, 1939   11 Sheets-Sheet 3

INVENTOR
ELLIS E. HEWITT
BY
ATTORNEY

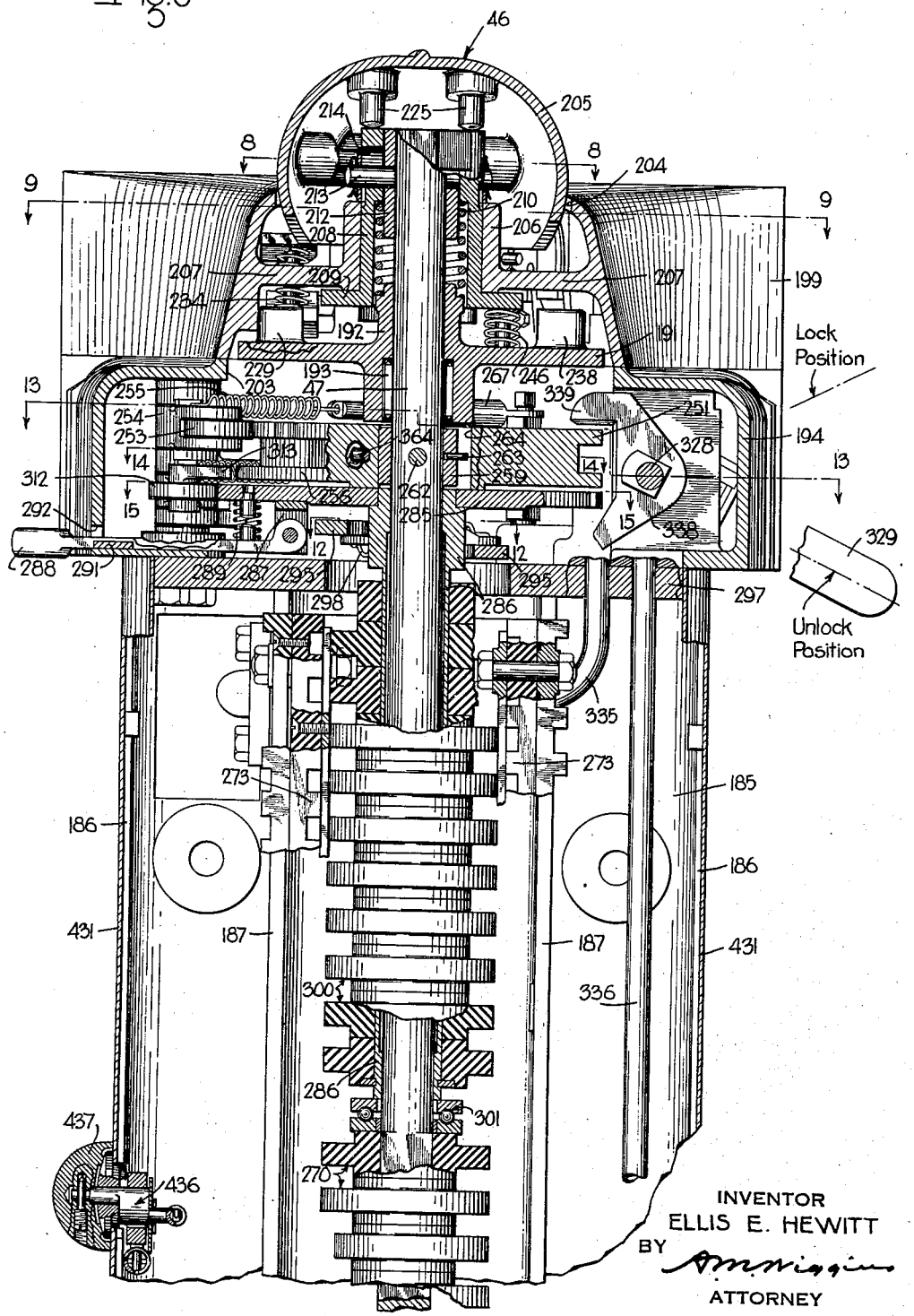

Sept. 17, 1940.  E. E. HEWITT  2,215,356
VEHICLE BRAKE AND MOTOR CONTROL SYSTEM
Filed July 28, 1939   11 Sheets-Sheet 7
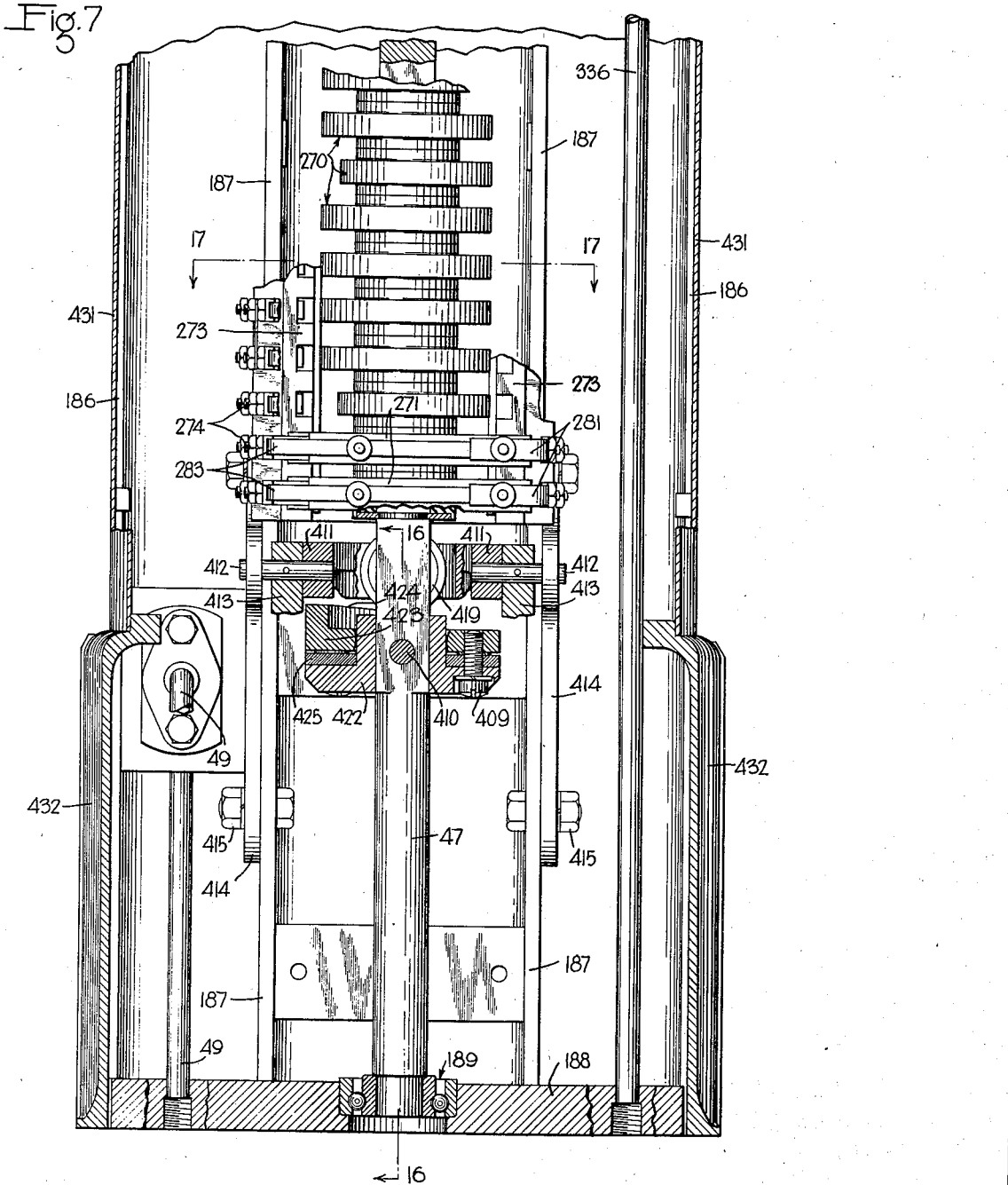
INVENTOR
ELLIS E. HEWITT
BY
ATTORNEY Sept. 17, 1940.       E. E. HEWITT      2,215,356
VEHICLE BRAKE AND MOTOR CONTROL SYSTEM
Filed July 28, 1939     11 Sheets-Sheet 8
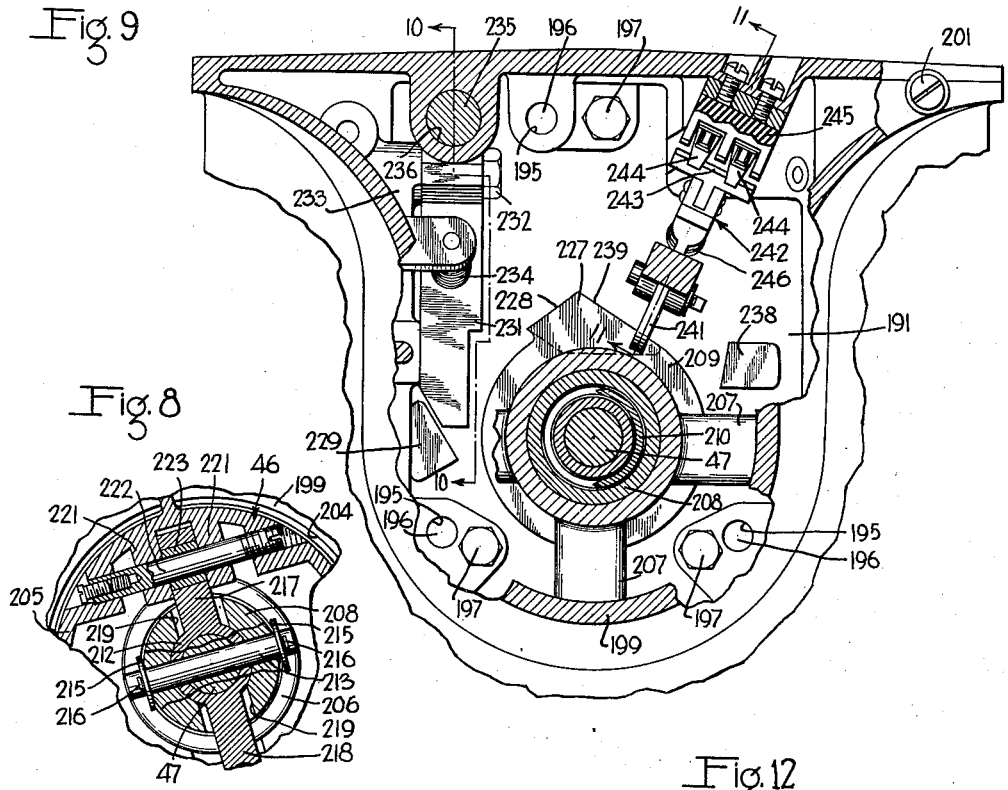
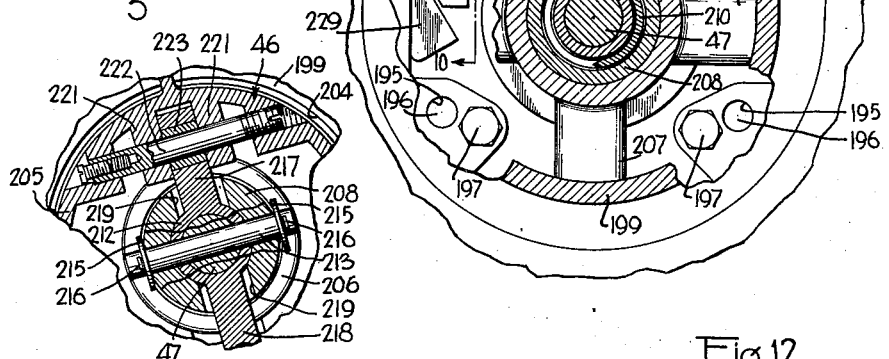
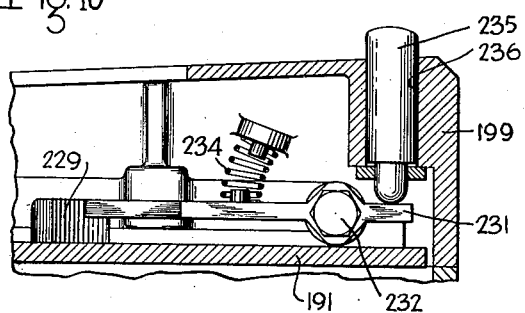
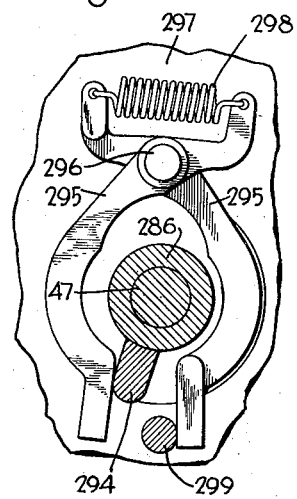
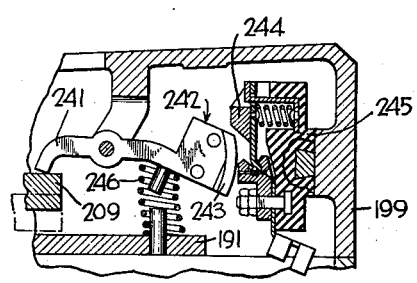
INVENTOR
ELLIS E. HEWITT
BY
ATTORNEY Sept. 17, 1940.　　　　　E. E. HEWITT　　　　　2,215,356
VEHICLE BRAKE AND MOTOR CONTROL SYSTEM
Filed July 28, 1939　　　11 Sheets-Sheet 9
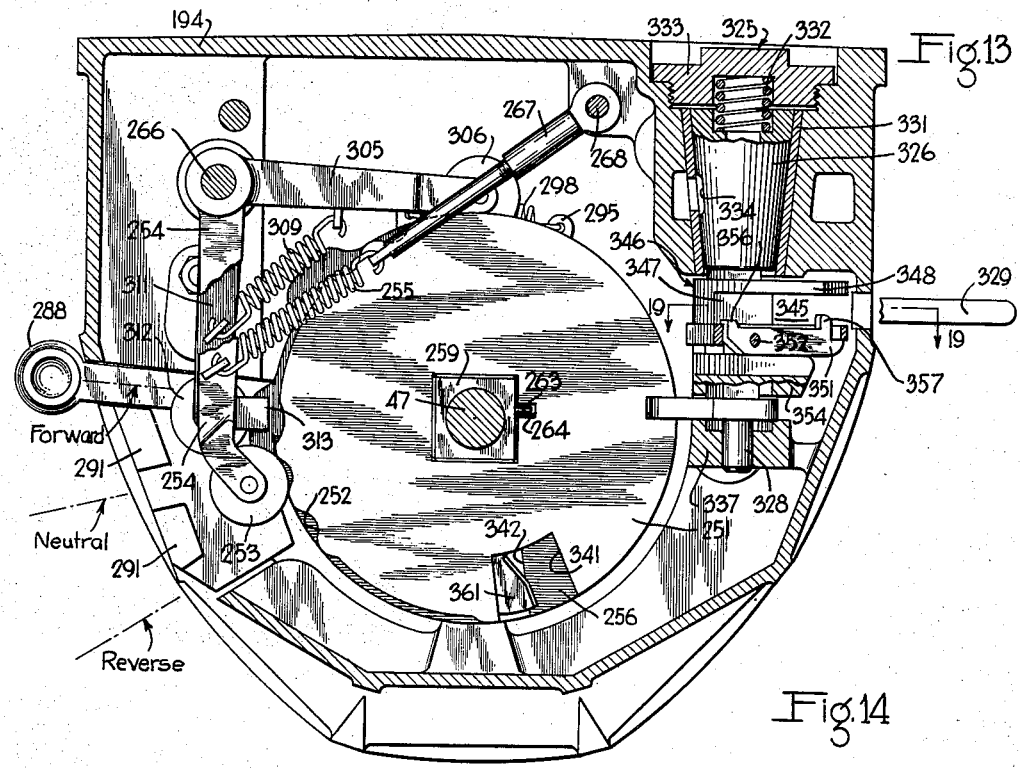
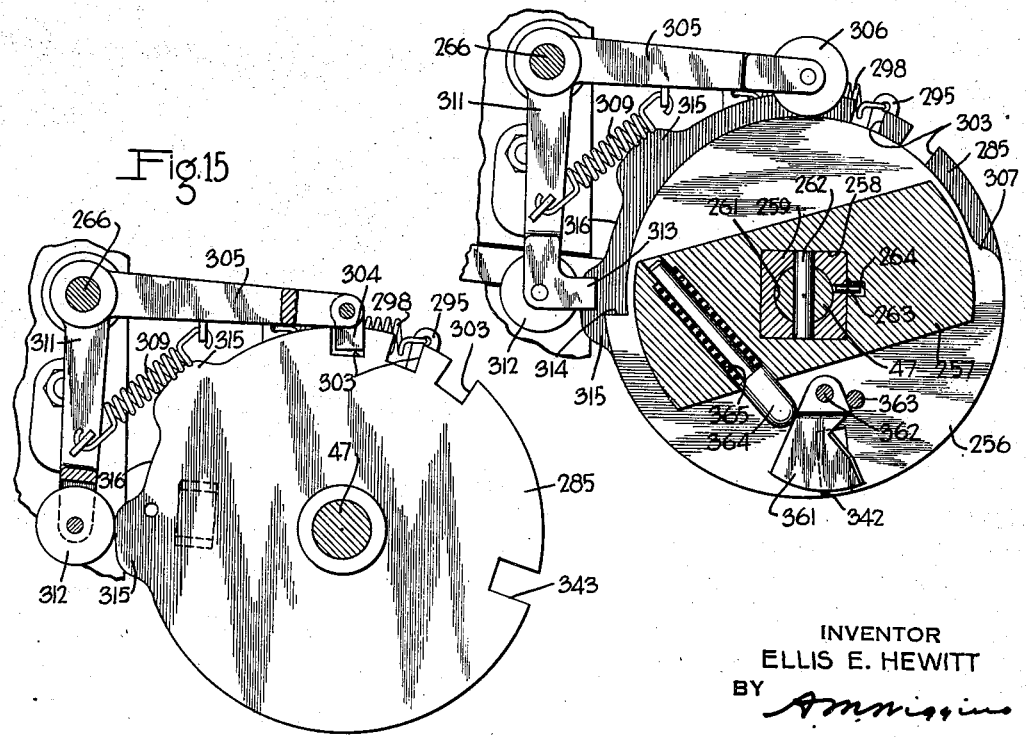
INVENTOR
ELLIS E. HEWITT
BY
ATTORNEY Sept. 17, 1940.  E. E. HEWITT  2,215,356
VEHICLE BRAKE AND MOTOR CONTROL SYSTEM
Filed July 28, 1939   11 Sheets-Sheet 10
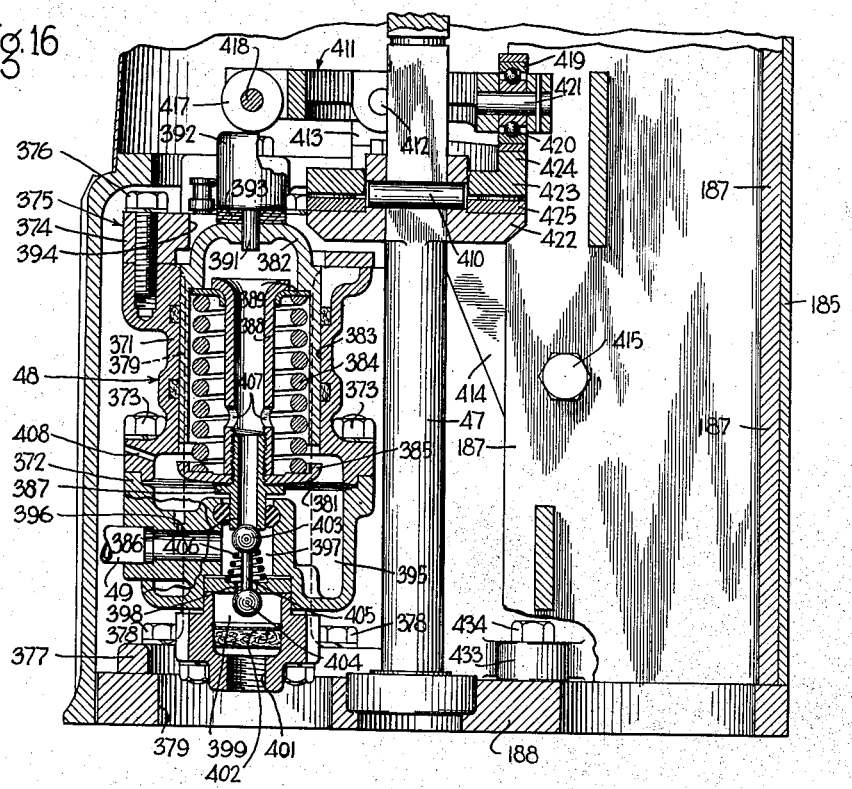
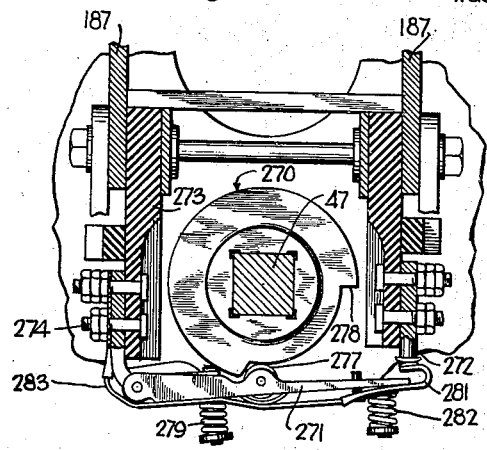
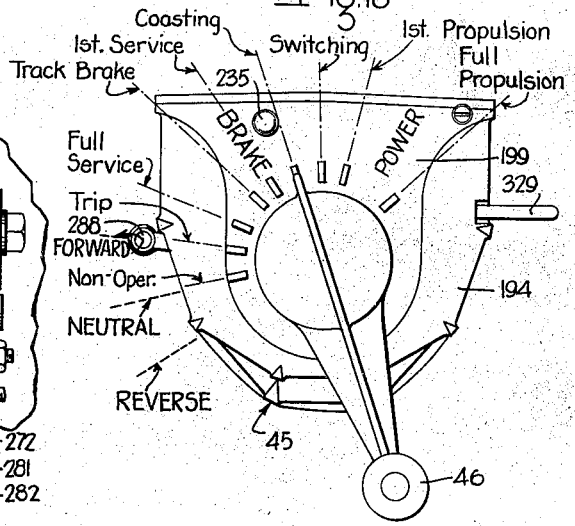
INVENTOR
ELLIS E. HEWITT
BY
ATTORNEY LOCK POSITION
(Lever removable)

UNLOCK POSITION
(Lever not removable)

Patented Sept. 17, 1940

2,215,356

UNITED STATES PATENT OFFICE 2,215,356

VEHICLE BRAKE AND MOTOR CONTROL SYSTEM

Ellis E. Hewitt, Edgewood, Pa., assignor to The Westinghouse Air Brake Company, Wilmerding, Pa., a corporation of Pennsylvania Application July 28, 1939, Serial No. 287,083

14 Claims. (Cl. 192—2)

This invention relates to vehicle brake and motor control systems and has particular relation to a control system for a multiple-unit vehicle or train whereby an operator on one of the units or cars may control the brakes and the motors on the separate units in unison.

At the present time there are street railway cars of the single-unit type in service having a brake system including magnetic track shoe brakes, pneumatically controlled friction brakes associated with the car wheels, and the driving motors adapted to act as dynamic brakes.

It is a general object of my invention to provide a brake and motor control system for a multiple-unit vehicle, such as a street railway train, having the three types of brakes heretofore employed on a single-unit car.

It is another object of my invention to provide a brake and motor control system for a multiple-unit vehicle, or a train of vehicles, of the double-end type in which the operator may control the motors and the brakes from control stations located at opposite ends of the multiple-unit vehicle.

It is another object of my invention to provide a brake and motor control system for a multiple-unit vehicle, or a train of vehicles, including a master controller of novel construction having an operating handle effective when operated in one direction out of a normal "coasting" position into a propulsion zone to control the propulsion motors on the separate units of the vehicle in unison and adapted when shifted in the opposite direction out of the "coasting" position into a braking zone to control the application of the brakes on the separate units of the vehicle in unison.

It is another object of my invention to provide a multiple-unit vehicle brake and motor control system of the character indicated in the foregoing objects in which an emergency application of the brakes is automatically effected in unison on all of the separate units of the vehicle in response to operation of conductor's devices, track trip devices and "deadman" devices as well as by an accidental and undesired separation or break-in-two of the separate units of the vehicle.

It is another object of my invention to provide a pneumatically controlled actuator device on each of a plurality of separate units of the vehicle adapted to be selectively controlled by operation of a master controller on one of the units to effect control of the propulsion motors and of the brakes on the separate units in unison.

It is another object of my invention to provide a master controller, of the type hereinbefore mentioned, incorporating therein a master reverser and having various interlock features for the purpose of insuring the proper positioning of the master reverser and the master controller under certain operating conditions.

It is another object of my invention to provide a master controller of the type hereinbefore mentioned adapted to insure the maintenance of the operating handle in its so-called trip position a sufficient length of time to insure the trip operation of the master circuit-breaker on each of the separate units.

It is another object of my invention to provide a master controller of the type hereinbefore mentioned and having a locking lever which can be removed by the operator only when the controller handle and the master reverser handle are properly positioned for changing control stations.

It is another object of my invention to provide a master controller, of the type mentioned in the foregoing object, in which the operation of the locking lever to a position in which it can be removed from the master controller is automatically effective to insure an emergency application of the brakes and also to effect closure of one end of a train pipe controlling the brakes.

It is another object of my invention to provide a multiple-unit brake and motor control system having a master controller of the type hereinbefore mentioned in which the release of the operating handle in any of the operating positions is effective to cause a "deadman" emergency application of the brakes except when the operating handle has been operated to effect at least a certain degree of application of the brakes.

It is another object of my invention to provide a master controller of the type hereinbefore mentioned and adapted to automatically prevent shifting of the operating handle of the master controller out of the normal or coasting position into the propulsion zone if the master reverser handle remains in its neutral position.

It is another object of my invention to provide a vehicle brake and motor control system including a wheel brake apparatus of the spring-applied air-released type wherein the propulsion of the vehicle is prevented in the event of failure of the spring-applied brakes to be released.

The above objects, and other objects of my invention which will be made apparent hereinafter, are attained by an embodiment of my invention subsequently to be described and shown in the accompanying drawings wherein, Figs. 1, 2, 3 and 4 taken together in side-by-side relation constitute a diagrammatic representation of the multiple-unit brake and motor control equipment comprising my invention, Fig. 5 is a diagrammatic view showing in simplified form the manner in which the local drum controllers on the separate units of the vehicle are adapted to control the motors both in propulsion and braking and also the manner in which the magnetic track shoe brakes are controlled.

Figs. 6 and 7 when placed together in vertical alignment constitute a vertical sectional view of the master controller shown in Fig. 1, the operating handle of the master controller being in its normal or "coasting" position and raised to "deadman" application position and the master reverser handle being in its "forward" position, Fig. 8 is a horizontal sectional view taken on the line 8—8 of Fig. 6, Fig. 9 is a horizontal sectional view taken on the ine 9—9 of Fig. 6, Figs. 10 and 11 are sectional views taken on the lines 10—10 and 11—11, respectively of Fig. 9, Fig. 12 is a fragmental sectional view taken on the line 12—12 of Fig. 6 showing a position-insuring means for the master reverser handle.

Figs. 13, 14 and 15 are horizontal sectional views taken on the lines 13—13, 14—14 and 15—15, respectively, of Fig. 6 showing further details of construction.

Fig. 16 is a fragmental vertical sectional view taken on the line 16—16 of Fig. 7, Fig. 17 is a fragmental horizontal sectional view taken on the line 17—17 of Fig. 7 showing the manner of mounting and construction details of the contact fingers of the controller, Fig. 18 is a plan view, on reduced scale, of the master controller, showing the various control positions of the controller handle, Fig. 19 is a fragmental sectional view, taken on the line 19—19 of Fig. 13 showing the locking mechanism whereby the locking lever can be removed from the master controller in one position only, Fig. 20 is an enlarged sectional view, showing details of the so-called release valve shown in outline form in Figs. 1 and 4.

Fig. 21 is an enlarged sectional view showing details of the application valve shown only in outline form in Figs. 1 and 4, Fig. 22 is a view taken substantially on the line 22—22 of Fig. 2, showing the details of the mechanism through which the actuators are adapted to operate the brake and motor controllers associated therewith.

DESCRIPTION

Referring to Figs. 1, 2, 3 and 4 taken together, the brake and motor control equipment comprising my invention is illustrated as applied to a multiple-unit train having three sections or units of the articulated type. For purposes of the present invention, the unit shown on Figs. 1 and 2 will be considered as the head end unit of the train, the unit shown on Figs. 3 and 4 will be considered as the rear end unit of the train and the unit shown partly in Fig. 2 and partly in Fig. 3 will be considered as the middle unit of the train and so designated hereinafter.

In view of the articulated construction of the units only four trucks, each of the four wheel type, are shown, one at the front end, one at the rear end, one at the juncture of the head end unit and the middle unit and one at the juncture of the middle unit and the rear end unit. In view of this arrangement of the trucks, the brake and motor control equipment is substantially entirely carried on the head end and the rear end units only, it being unnecessary for the middle unit to carry any control apparatus except as hereafter described.

As shown diagrammatically, each of the two pairs of wheels of each truck is provided with a brake cylinder 11 for controlling the application and the release of friction brake devices associated with the corresponding pair of wheels. Suspended on coil springs 12 at a normal clearance distance above the track rails 13, one on each side of a wheel truck, between the front and rear pairs of wheels is a magnetic track brake device 14. Suitably associated in driving relation to the respective axles of the wheel truck on the head end unit are propulsion motors 15, 16, 17 and 18 respectively. In a similar manner the respective wheel axles of the two wheel trucks associated with the rear end unit are provided with propulsion motors 15, 16, 17 and 18 respectively, the motor 15 being omitted since half of the wheel truck at the rear end of the rear end unit is broken away.

As diagrammatically shown, particularly in Fig. 2, a pair of brake shoes 19 is provided for each front and each rear pair of wheels of each wheel truck, one shoe of each pair being adapted to engage the tread or rim of a corresponding wheel. The two brake shoes of a given pair are each pivotally carried at the end of a lever 21, the two levers 21 being fixed at opposite ends of an operating shaft or rod 22 that extends transversely of the wheel truck and is suitably mounted for rotation in the truck frame in a manner not shown. The brake cylinder 11 for each pair of wheels is suitably mounted in the truck frame and has a piston 23 therein (see Fig. 2) provided with a piston stem 24 that is pivotally connected to an operating lever 25 that is in turn fixed to the operating rod or shaft 22.

When fluid under pressure is supplied to the chamber 26 at one side of the piston 23, the piston 23 is shifted in a direction to effect rotation of the operating shaft 22 in a direction to shift the brake shoes 19 out of engagement with the tread surface of the car wheels and thus release the brakes. When fluid under pressure is released from the chamber 26 in the brake cylinder 11, a coil spring 27 interposed between the piston 23 and the end cover or head of the brake cylinder becomes effective to urge the piston 23 in a direction to rotate the operating rod 22 correspondingly so that the brake shoes 19 are shifted into frictional braking engagement with the tread surface of the wheel.

It should be understood that any other suitable arrangement may be provided whereby the brake shoes are applied by the force of a spring and released by fluid pressure.

The magnetic track brake devices 14 are of conventional construction and have a track engaging portion or shoe of magnetic material with which is associated an electromagnet winding 14a. The magnetic attraction set up between a track rail and the shoe of the track brake device 14 in response to energization of the electromagnet winding 14a overcomes the force of the supporting spring 12 and consequently shifts the shoe into frictional braking contact with the rail.

The degree of retardation produced by the track brake devices varies with the degree of energization of the electromagnet winding. As will be seen hereinafter, the degree of energization of the electromagnet winding of the track brake devices is suitably varied in accordance with a desired degree of application of the brakes.

The propulsion motors 15 to 18 are standard type motors and for purposes of illustration are indicated as of the direct drive type in which the wheel axle forms the motor armature shaft, the stator and frame of the motors being suitably supported and secured to the truck frame.

The supply and release of fluid under pressure to and from the brake cylinders 11 on the head end unit is under the control of a relay valve 31 of well known construction mounted in a suitable place on the unit. The relay valve 31 is operatively controlled by fluid under pressure supplied thereto alternatively under the control of either a lock-out magnet valve 32 or a self-lapping brake valve 33 of well known construction. A double check valve 34 is interposed between the lock-out magnet valve 32 and the brake valve 33 in the supply communication to the relay valve 31.

The motors 15, 16, 17 and 18 on the head end unit are under the control of a brake controller 35 which, as will be described in greater detail hereinafter in connection with Fig. 5, is adapted to establish suitable circuits for causing the motors to act as dynamic brakes and also for controlling the supply of current to the electromagnet windings of the magnetic track brake devices.

Motors 15, 16, 17 and 18 on the head end unit are also under the control of a propulsion controller 36 which is effective to cause the motors to drive the vehicle in a manner subsequently to be described in connection with Fig. 5.

Each of the controllers 35 and 36 is provided with an operating shaft 35a and 36a respectively adapted to be selectively rotated by a so-called actuator 37. The self-lapping brake valve 33 has a rotary operating shaft 33a which is connected to an extension of the shaft 35a of the brake controller 35, as by a coupling 38. Thus the operating shaft of the brake controller 35 and the shaft of the self-lapping brake valve 33 are simultaneously rotarily shifted in unison by the actuator 37.

In a similar manner, corresponding apparatus is provided on the rear end unit for controlling the operation of the motors 15 to 18 on the rear end unit, the magnetic track brake devices 14 on the rear end unit and the brake cylinders 11 on the rear end unit, the different parts and devices being designated by the same reference numerals by which they are identified on the head end unit.

Extending in conventional manner through all units of the train are two train pipes 41 and 42, referred to hereinafter as the supply pipe and the control pipe respectively. The supply pipe 41 is constantly charged to a selected pressure such as one hundred pounds per square inch, fluid under pressure being supplied thereto from a plurality of reservoirs 43, two of which are shown for purposes of illustration, one on the head end unit and one on the rear end unit. The reservoirs 43 are adapted to be charged with fluid under pressure by suitable fluid compressors (not shown) individual to each reservoir.

As shown in Figs. 2 and 4, a branch pipe 41a of the supply pipe 41 is provided on the head end unit and on the rear end unit respectively, which branch pipe leads to the relay valve 31, the lock-out magnet valve 32, the self-lapping brake valve 33 and the actuator 37 on the corresponding unit. An air filter 44 of suitable type is provided in the supply pipe 41 closely adjacent each of the branch pipes 41a to insure a filtered supply of fluid under pressure to these devices.

The actuators 37 are operatively controlled according to the pressure in the control pipe 42. The pressure in the control pipe 42 is under the control of a master controller 45 suitably mounted and located at a control station on the head end unit and, alternatively, also under the control of a similar master controller 45 at a suitable control station on the rear end unit.

The master controller 45 is a particular feature of my invention and will be described in detail hereinafter. For present purposes it is necessary to explain only that the master controller 45 has an operating handle 46 which has a central position designated "coasting" position, (see Figs. 1 and 18). When the operating handle 46 is shifted in one direction out of the "coasting" position, it passes successively through four different spaced positions designated respectively "first service," "full service," "trip" and "non-operative" positions. When the operating handle 46 is shifted in the opposite direction from the "coasting" position, it passes successively through three positions designated respectively "switching," "first propulsion" and "full propulsion."

As will be explained more fully hereinafter, the controller handle 46 is adapted upon operative movement to rotate an operating shaft 47 which is effective through suitable mechanism subsequently to be described to operate a self-lapping valve device 48. The self-lapping valve device 48 supplies fluid at a pressure corresponding to the position of the operating handle 46 from the supply pipe 41 to a pipe 49 leading to a relay valve 51, of well-known construction. Relay valve 51 in turn controls the supply of fluid under pressure from the supply pipe 41 into a pipe 52 connected to the control pipe 42 through a so-called release valve 53 and an application valve 54.

As will be seen hereinafter, the release valve 53 and the application valve 54 are under the control of an emergency trip magnet valve and switch device 55, hereinafter designated the emergency trip magnet valve. As will be further seen hereinafter, with the operator stationed at the control station of the head-end unit, the emergency trip magnet valve 55 on the head end unit is conditioned to cause the release valve 53 to permit the supply of fluid under pressure to the control pipe 42 whereas the emergency magnet valve 55 on the rear end unit is conditioned to cause the release valve 53 associated therewith to close the control pipe at the rear end of the train.

With the operating handle 46 of the master controller 45 at the control station occupied by the operator in its "coasting" position, the control pipe 42 is normally charged to a certain pressure, such as for example forty-five pounds per square inch.

When the operating handle 46 of the master controller 45 is in its "first service" position, the pressure in the control pipe 42 is reduced to a value, such as thirty-five pounds per square inch; and when the handle is in its "full service" position, the pressure in the control pipe 42 is further reduced to a value, such as ten pounds per square inch. On the other hand, when the master controller handle 42 is shifted into its "switching" position, the pressure in the control pipe 42 is increased from the normal pressure to a certain pressure such as fifty-five pounds per square inch. The pressure in the control pipe 42 is further increased, upon further displacement of the operating handle into the "first propulsion" position, to a value such as sixty-five pounds per square inch. With the controller handle in its "full propulsion" position, the pressure in the control pipe is further increased to a value such as eighty pounds per square inch.

As will be explained more fully hereinafter, the reduction of the pressure in the control pipe 42 from the normal pressure causes the actuator devices 37 on the different units to correspondingly operate the brake controller 35 and self-lapping brake valve 33 on the corresponding unit while the propulsion controller 36 remains stationary in its normal position in which the supply of current to the propulsion motors is cut off. On the other hand, the increase from the normal pressure in the control pipe is effective to cause the actuators 37 to correspondingly operate the propulsion controllers 36 without operating the brake controllers 35 and self-lapping brake valves 33.

The equipment shown in Figs. 1 to 4 further includes a number of electrical switches, relays, contactors and other electrical devices cooperatively connected and associated through circuits including fourteen train wires designated 61 to 74 inclusive, the sections of the train wires on the several units being connected by suitable couplers 75.

A storage battery 77, adapted to be maintained charged by suitable charging equipment not shown, is provided on the head end unit and the rear end unit respectively as shown in Figs. 2 and 4. The positive terminal of each of the batteries 77 is connected by a branch wire 78 to the train wire 62 and the wire 62 is thus hereinafter designated the positive battery wire. The negative terminal of each of the batteries is connected to ground and to the train wire 61 by a branch wire 79 and the train wire 61 is thus hereinafter designated the negative battery wire.

The train wires 63 and 64 are adapted to be energized alternatively under the control of a master reverser associatively combined with the master controller 45 for the purpose of controlling the "forward" and the "reverse" operating windings 81 and 82 respectively of local reversers 83 on the head end and rear end units respectively. The local reversers 83 are adapted to control the motor circuits on the corresponding unit, in manner not shown but well understood by those skilled in the art, for the purpose of controlling the direction of rotation of the motors to correspondingly propel the train in forward or reverse direction.

The electromagnet windings 14a of the magnetic track brake devices on the different units are energized by current supplied from the parallel-connected batteries 77 under the control of a master circuit-breaker 85 on the corresponding unit which also serves to control the supply of current to the relays controlling the dynamic braking circuits including the propulsion motors 15 to 18 on the corresponding unit.

In the case of an emergency application of the brakes, a contactor or switch device 86 is operative to shunt the brake controller 35 to supply maximum current to the electromagnet windings of the track brake devices, the contactor 86 being controlled by an electrical relay 87 that is in turn controlled by the emergency trip magnet valve 55, in a manner to be subsequently explained, through the medium of the train wire 73 that is consequently hereinafter designated the emergency wire.

Located adjacent each of the relay valves 31, in Figs. 2 and 4, is a two-position pressure switch 89 which is operatively controlled according to the pressure in the brake cylinders 11 on the corresponding units. The pressure switches 89 are connected in series relation and are adapted, in the position assumed thereby when the proper pressure is established in the brake cylinders for fully releasing the brake shoes 19, to establish a circuit through the train wire 69 from the head to rear ends of the train. A relay 91, hereafter referred to as the control relay, is provided on the head end unit and a similar relay 91 is provided on the rear end unit. One or the other of the control relays 91 is adapted to be energized when the circuit through the train wire 69 is completed, depending upon whether the operator is at the control station on the head end or the rear end unit.

If the pressure in the brake cylinders 11 is below a certain pressure required to effect release of the wheel brakes, the corresponding pressure switch 89 interrupts the circuit through the train wire 69 to cause the control relay 91 to be operated to prevent the propulsion circuit for the propulsion motors 15 to 18 from being set up. At the same time, in its latter position the pressure switch 89 establishes a circuit through the train wire 72 to cause illumination of an indicating lamp 92 on the corresponding unit adjacent the master controller 45. Each pressure switch 89 controls a corresponding indicating lamp 92 selectively so that indication is thereby given as to the particular unit on which the brakes remain applied.

Connected in series relation in the train wire 71 are a plurality of switch devices 94. The switch devices 94 are door-controlled switches which are actuated to closed position as shown when the associated door is closed and which are actuated to a circuit-opening position when the corresponding door is opened. Operating on and controlled by the circuit including the door wire 71 is a door relay 95, one being provided at the control station for the head end unit and one being provided for the control station at the rear end unit. As will be seen hereinafter, only one of the door relays 95 is effective depending upon the operator being stationed at the corresponding control station. The door relay 95 at the head end or rear end control stations operates jointly with the corresponding control relay 91 to prevent the supply of propulsion current to the propulsion motors of all units if the door wire circuit is interrupted due to a door on any of the units being left open.

A switch 96 of the push-button type is provided for each of the door relays 95 to establish a parallel or shunt circuit around the relay contacts to render the relay ineffective under certain circumstances where an open door on any of the units is for some reason desired while the train is in motion.

Included in series relation in the train wire 74 are a plurality of normally-closed switches 97 of the manually operable type, hereinafter called conductor's switches. The conductor's switches 97 are located at suitable points on each unit of the train and are effective, when operated to open position, to interrupt a normally closed circuit including the wire 74, which will hereinafter be termed the conductor's wire.

Operating on the circuit including the conductor's wire 74 is the magnet valve device 55 and a relay or switch device 98, hereinafter called the emergency switch device, which is effective automatically upon interruption of the conductor's wire to cause interruption of the supply of propulsion current to the motors 15 to 18 of the corresponding unit.

Associated with the switch 98 on the head end unit are a control switch 99 and a reset switch 101. In a similar manner, a control switch 99 and a reset switch 101 are provided at the rear end control station. The switches 99 and 101 are indicated diagrammatically but it will be understood that they are of the two-position type. The control switches 99 are of the key or snap type adapted to remain in either of two positions. The reset switches 101 are normally biased to a normal position and are operative to a second position by the application of manually applied pressure.

The circuit including the conductor's wire 74 on which the emergency trip magnet valve 55 and emergency switch device 98 at the head end control station operate also includes a track trip switch 102. A similar track trip switch 102 is provided at the rear end control station in the circuit of the emergency trip magnet valve 55 and emergency switch device 98 at the rear end control station. The track trip switches 102 are suitably located so as to cooperate with a projection along the track adapted in well known manner to operate the switches to open position in the event that the train runs past a signal.

Referring to Fig. 5, the equipment provided for controlling the propulsion circuits, the dynamic braking circuit, and the track brake circuit includes in addition to the brake controller 35 and propulsion controller 36, two propulsion relays 103 and 104, an overload relay 105, a rheostat 106 of the motor operated type, and a dynamic braking relay 107.

It will be understood that the diagram shown in Fig. 5 represents only the control exercised by the brake controller 35 and the propulsion controller 36 on one of the units over the corresponding motors, for example the head end unit. In Fig. 5, the armature windings of the motors 15 to 18 are designated by the corresponding reference numerals with the suffix "a" and the series field windings of the motors are designated by the corresponding reference numeral with the suffix "f".

It will be understood that, in Fig. 5, certain of the train wires not concerned with the equipment shown are omitted for simplicity.

DETAILED DESCRIPTION OF PARTS OF THE EQUIPMENT

Figure 1:
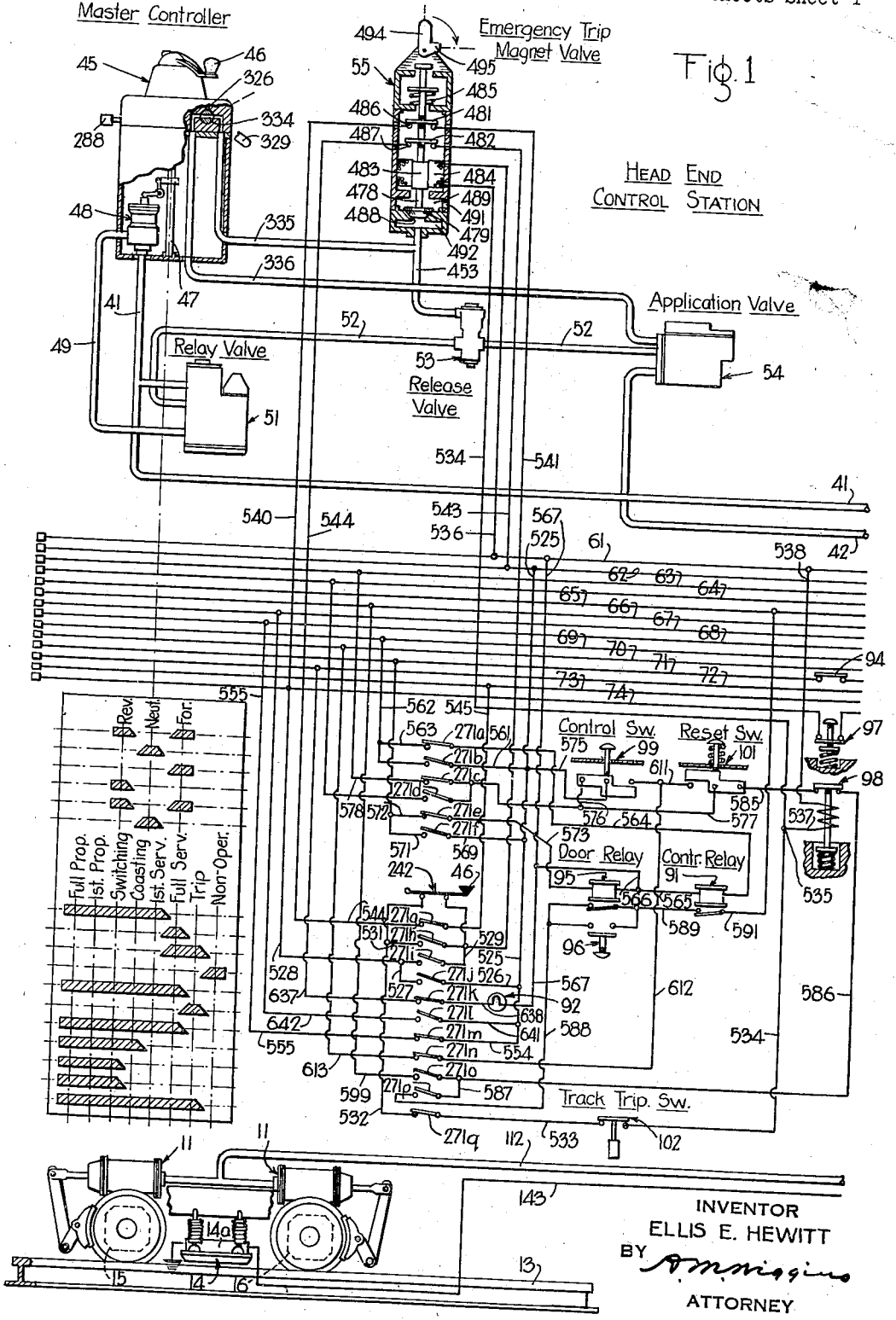

Thus far the equipment has been described in general terms only. A specific and detailed description of certain parts of the equipment is accordingly necessary and such description is accordingly now given, the parts being described substantially in the order in which they were mentioned in the above general description.

(a) *Relay valve 31, lock-out magnet valve 32 and self-lapping brake valve 33*

The relay valve 31 needs no specific description thereof inasmuch as it is the well known E type relay valve commonly employed in air brake equipment. A relay valve of this type is shown and described in detail in Patent No. 2,038,167 to C. C. Farmer and E. E. Hewitt. Briefly, it comprises an operating piston for operating an exhaust valve and a supply valve, the piston being subject on one side to the pressure of fluid supplied thereto through a pipe 111 from the outlet port of double check valve 34. The relay valve 31 is automatically self-lapping and delivers fluid through pipes 112, 113 and 114 to the pressure chambers 26 of the brake cylinders 11 on the corresponding units, the pressure established in the brake cylinders corresponding to the degree of control pressure acting on the piston and supplied through the pipe 111. As previously indicated, the relay valve 31 controls the supply of fluid under pressure from the branch pipe 41a of the supply pipe 41 to the brake cylinder pipe 112.

Figure 5:
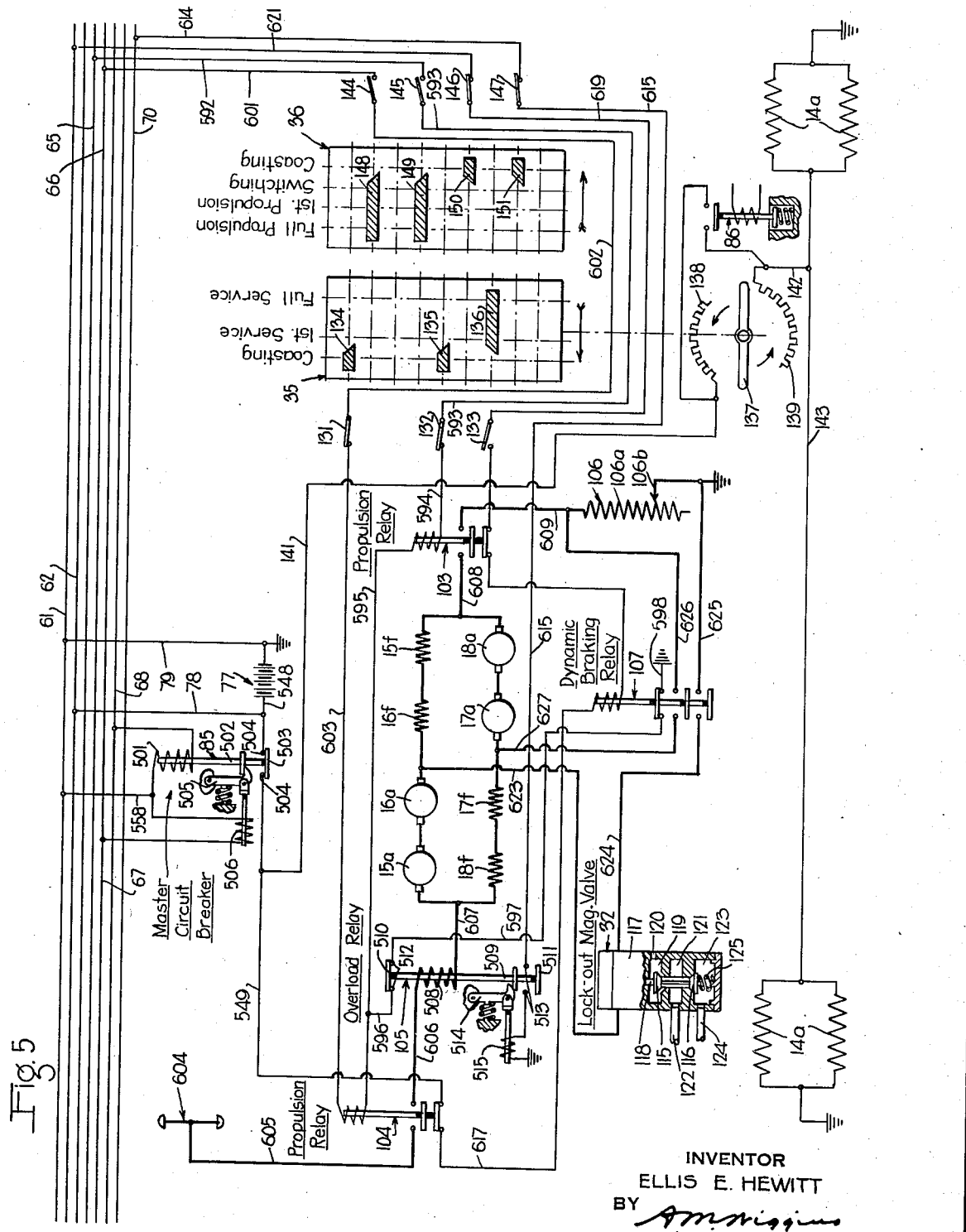

The lock-out magnet valve 32 is of conventional type and is indicated diagrammatically in section in Fig. 5. As shown in Fig. 5, the lock-out magnet valve 32 comprises a suitable casing containing a pair of oppositely seating valves 115 and 116 of the poppet type and an electromagnet winding 117 effective through a plunger 118 to operate the valves 115 and 116. As will be seen hereinafter, the electromagnet winding 117 operates on the dynamic braking circuit and is energized according to the dynamic braking current.

Valve 115 is contained in a chamber 119 that is constantly open to atmosphere through an exhaust port 120. The valve 115 is adapted to seat on an associated valve seat formed on a wall in the casing which separates the chamber 119 from a chamber 121 to which one end of the double check valve 34 is connected through a pipe 122.

The valve 116 is contained in a chamber 123 that is constantly connected through a pipe 124 to the branch pipe 41a of the supply pipe 41. A coil spring 125, interposed between the valve 116 and the end of the casing, urges the valve into seated relation on an associated valve seat formed on a wall which separates the chamber 123 from the chamber 121.

The two valves 115 and 116 are provided with fluted stems that extend through the walls forming the associated valve seats, the ends of the two stems meeting in end-to-end contact within the chamber 121. The stems of the valves 115 and 116 are of such length that when the valve 116 is seated as shown, the valve 115 is unseated and, conversely, when the valve 115 is seated, the valve 116 is unseated.

The electromagnet winding 117 is so designed that as long as it is energized by a current in excess of a certain value, the downward force exerted by the plunger 118 on the valve 115 is effective to overcome the force of the spring 125 and consequently cause the valves 115 and 116 to be seated and unseated respectively. When the current energizing the magnet winding 117 falls below such certain value, which may occur at a low speed of for example ten miles per hour speed, the spring 125 becomes effective to shift the valves 115 and 116 to seated and unseated positions respectively.

With the valves 115 and 116 unseated and seated as shown, the chamber 121 and consequently the one end of the double check valve 34 is connected to atmosphere through the exhaust port 120. With the valves 115 and 116 respectively seated and unseated, the exhaust communication just described is closed and fluid under pressure is supplied from the pipe 124 past the valve 116 to the pipe 122.

The double check valve 34 is of conventional construction and comprises a shiftable valve element that is operated in response to the pressure delivered through the pipe 122 to a position for establishing connection between the pipe 122 and the pipe 111 leading to the relay valve 31.

It will thus be seen that when the dynamic braking current exceeds a certain value, the lockout magnet 32 is conditioned to cause fluid under pressure in the supply pipe 41 to be delivered to the relay valve 31, which is in turn operative to supply pressure fluid at a corresponding pressure to the brake cylinders 11 to maintain the brakes released.

The self-lapping relay valve 33 is also of well-known construction and needs no specific description. A relay valve of this type is shown and described in detail in Patent 2,042,112 to E. K. Lynn and Rankin J. Bush. As previously indicated, the brake valve 33 has a rotary operating rod 33a which is effective upon rotation to condition the brake valve 33 to supply fluid from the branch 41a of the supply pipe 41 to a pipe 127 leading to the end of the double check valve 34 opposite to that to which the pipe 122 is connected.

In the normal position of the operating rod 33a of the brake valve 33, the brake valve is conditioned to supply fluid into the pipe 127 at a pressure such as seventy-five pounds per square inch. As the operating rod 33a is rotarily shifted by operation of the actuator 37, in a manner hereinafter to be described, out of its normal position the brake valve 33 is operative to reduce the pressure delivered to the pipe 127.

The pressure delivered by the lock-out magnet valve through pipe 122 to the double check valve 34 is higher than the maximum pressure delivered by the brake valve 33 to the opposite end of the double check valve since the fluid pressure in the supply pipe 41 is assumed to be one hundred pounds per square inch, whereas the assumed maximum pressure of fluid delivered through pipe 127 to the double check valve is assumed to be seventy-five pounds per square inch. Accordingly, as long as the dynamic braking current maintains the lock-out magnet valve 32 is position to supply pressure to the relay valve 31, the fluid pressure controlled brakes remain released. When the lock-out magnet 32 is operated to cut off the supply of fluid pressure through the pipe 122 to the double check valve 34, the valve element of the double check valve 34 is accordingly shifted in response to the pressure in pipe 127 to a position to establish communication between the pipe 127 and the pipe 111 leading to the relay valve 31, which is thus correspondingly operated according to the pressure supplied under the control of the brake valve 33. With the operating rod 33a of the brake valve 33 rotatively shifted out of it normal position so that the pressure delivered to the relay valve 31 is a relatively low pressure, the relay valve 31 is operative to reduce the pressure in the brake cylinders 11 and consequently permit the springs 27 to become effective to actuate the brake shoes 19 into braking engagement with the tread or rim surface of the vehicle wheels.

(b) *Brake controller 35 and propulsion controller 36*

Figure 2:
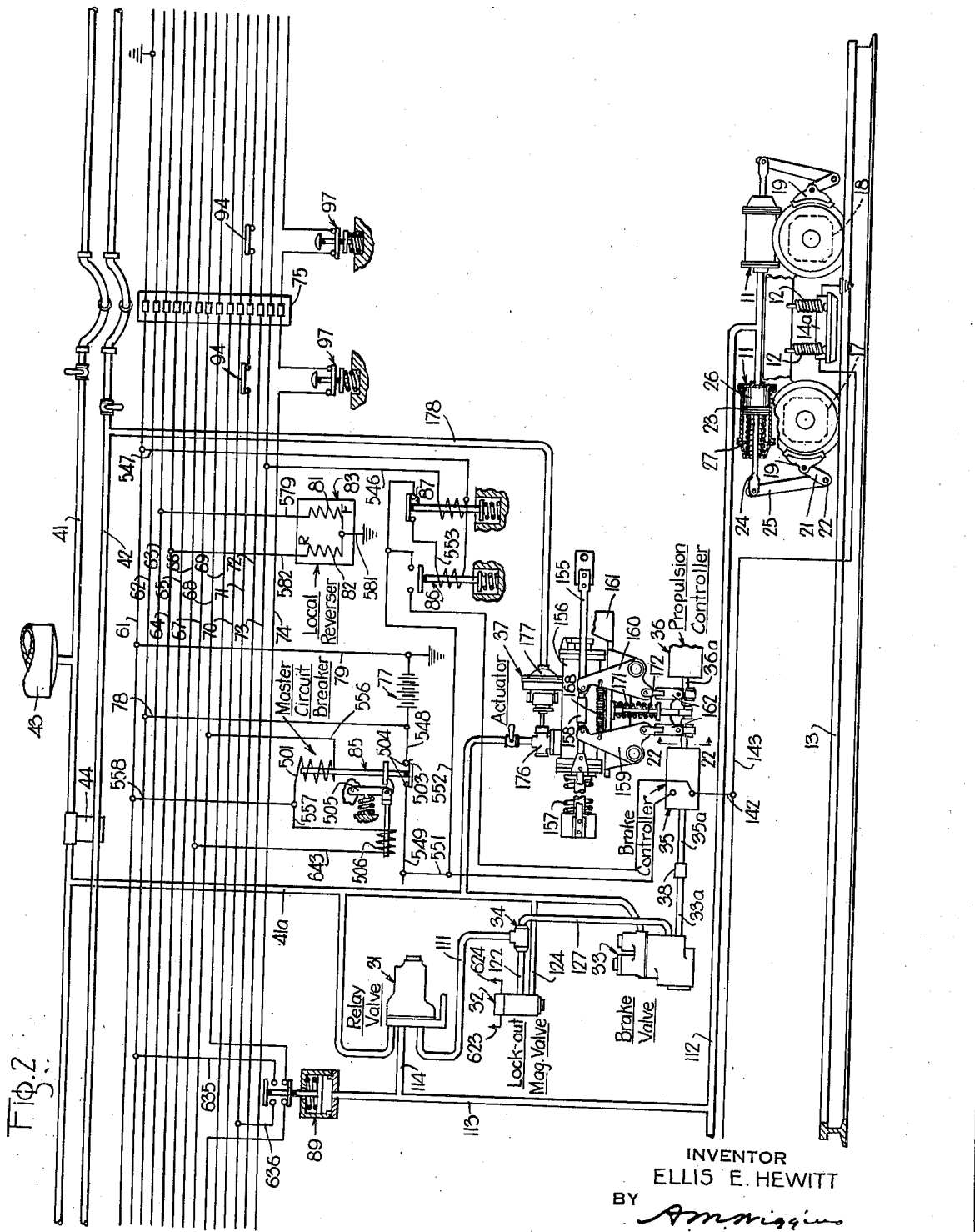
Figure 3:
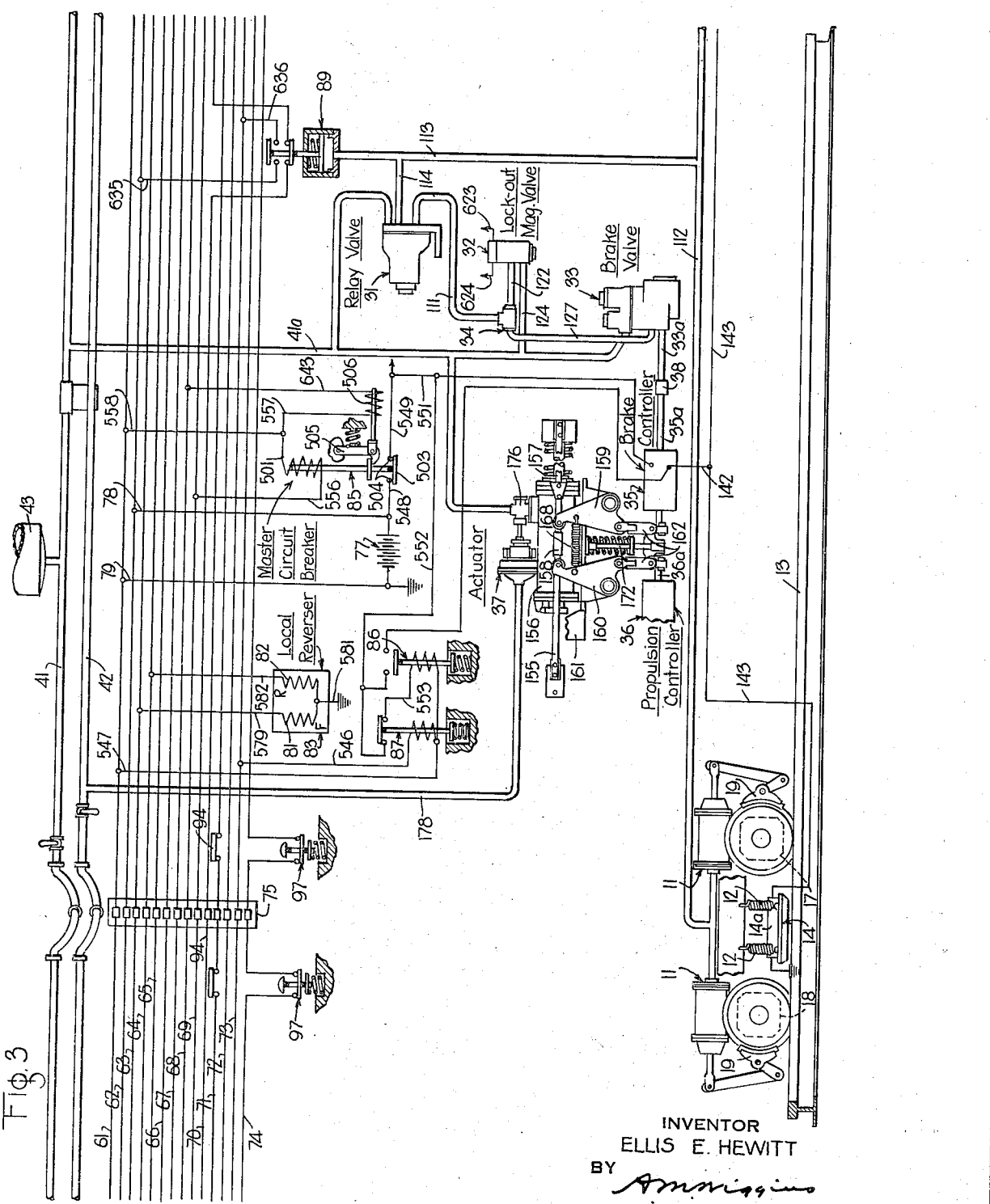

The brake controller 35 and propulsion controller 36 are indicated in outline form only in Figs. 2 and 3 and in diagrammatic developed form in Fig. 5. Referring to Fig. 5, the brake controller 35 is indicated as comprising a plurality of switches of the contact finger type, 131, 132 and 133 respectively, which are operative to open and closed positions by a cooperating rotary cam fixed on the operating shaft 35a of the controller. These cams are represented diagrammatically by the cam elements 134, 135 and 136. It will be understood that when the rotary shaft 35a of the brake controller is in an operating position covered by the corresponding cam element, the switch opposite the cam element is actuated to closed position. When the rotary shaft of the brake controller 35 is in a position not covered by the cam element, the switch opposite the cam element is in open position. For example, in Fig. 5 where the rotary shaft of the brake controller 35 is in its normal or "coasting" position, the switches 131 and 132 opposite the cam elements 134 and 135 respectively are shown in closed position while the switch 133 is in open position since the cam element 136 does not cover the "coasting" position of the controller.

The brake controller 35 also includes a rotary brush device 137 which is arranged to be rotated by rotation of the rotary shaft 35a of the controller and which is correspondingly positioned. The rotary brush device 137 contacts a stationary commutator device, not shown, having two groups of commutator segments providing tap connections to two resistors 138 and 139 stationarily mounted in the casing of the controller 35.

As seen in Fig. 5, one end of the resistor 138 is connected by a wire 141 to the positive terminal of the storage battery 77 under the control of the circuit-breaker 85 and one end of the resistor 139 is connected by a branch wire 142 and a wire 143 to common terminals of the track brake electromagnet windings 14a of the corresponding unit, the opposite terminals of which are connected to the negative terminal of the battery 77 as through a ground connection shown.

In the normal position of the operating shaft 35a of the brake controller 35, the brush device 137 interrupts the connection between the free ends of the two resistors 138 and 139. As the shaft 35a is rotated by the actuator 37 out of its normal position a predetermined amount, which as hereinafter explained occurs at some point between the "first service" and "full service" positions of the controller 35, the brush device 137 connects the free ends of the resistors 138 and 139, thereby establishing a circuit for energizing the electromagnet windings 14a of the track brake devices through the full amount of the resistors 138 and 139.

As the rotary shaft 35a of the brake controller 35 is further displaced out of its normal position, the brush device 137 simultaneously cuts out of the energizing circuit of the track brake electromagnet windings 14a an increasing amount of both of the resistors 138 and 139.

The propulsion controller 36 is similar in construction to the brake controller 35 and, as shown in Fig. 5, may comprise a plurality of switches of the contact finger type 144, 145, 146 and 147 that are operated by rotary cams indicated by the cam elements 148, 149, 151 and 152 located respectively opposite the switch devices 144 to 147.

Although not shown, it should be understood that associated with each of the controllers 35 and 36 is an additional rotary cam which functions through a conventional current responsive relay in the motor circuit in well-known manner to control the operation of the motor operated rheostat 106 in effecting different degrees of dynamic braking and rates of acceleration.

(c) Actuator 37

The actuator 37 is of the type described in detail and claimed in my copending application Serial No. 258,443, filed February 25, 1939 to which reference may be had.

Briefly, the actuator 37 comprises a crosshead or shiftable frame 155 of rectangular construction that is suitably supported and guided on a cylinder 156 and biased to a normal position by a coil spring 157. The arrangement of the crosshead 155 with respect to the spring 157 is such that the spring 157 is compressed when the crosshead is shifted in either direction out of the normal position in which it is shown.

The crosshead 155 is provided with a centrally disposed lug 158 thereon in a manner to selectively engage one or the other of two bell-crank levers 159 and 160 that are pivoted at the fulcrums thereof in spaced relation on a fixed support 161.

Figure 22:
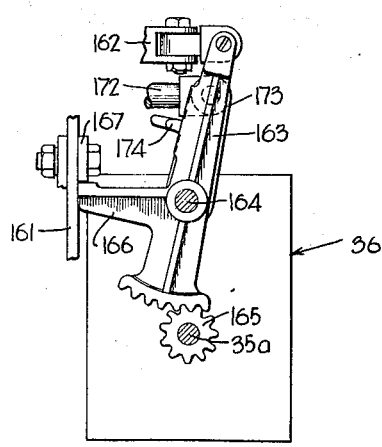

As shown partly in Figs. 2 and 3 and partly in Fig. 22, the arm of the bell crank 159 opposite that engaged by the lug 158 is connected by a link 162 to the upper end of a gear segment 163 suitably pivoted on a pin 164 carried by the fixed support 161 in manner not shown. The lower end of the gear segment 163 is provided with gear teeth for cooperatively meshing with a pinion 165 fixed on the operating shaft 35a of the brake controller. The gear segment 163 has a laterally projecting arm 166 that engages a stop 167, fixed on the support 161, to limit the movement of the gear segment in a clockwise direction as seen in Fig. 22 and thereby define the normal position of the shaft 35a of the brake controller.

In a similar manner, the bell-crank 160 is connected by a link 162 to a gear segment 163, the teeth of which mesh with a pinion 165 fixed on the operating shaft 36a of the propulsion controller 36. The arm 166 on the latter gear segment 163 is adapted to engage a fixed stop corresponding to the stop 167 to limit the movement of the gear segment in one direction and thereby define the normal position of the controller shaft 36a.

Figure 4:
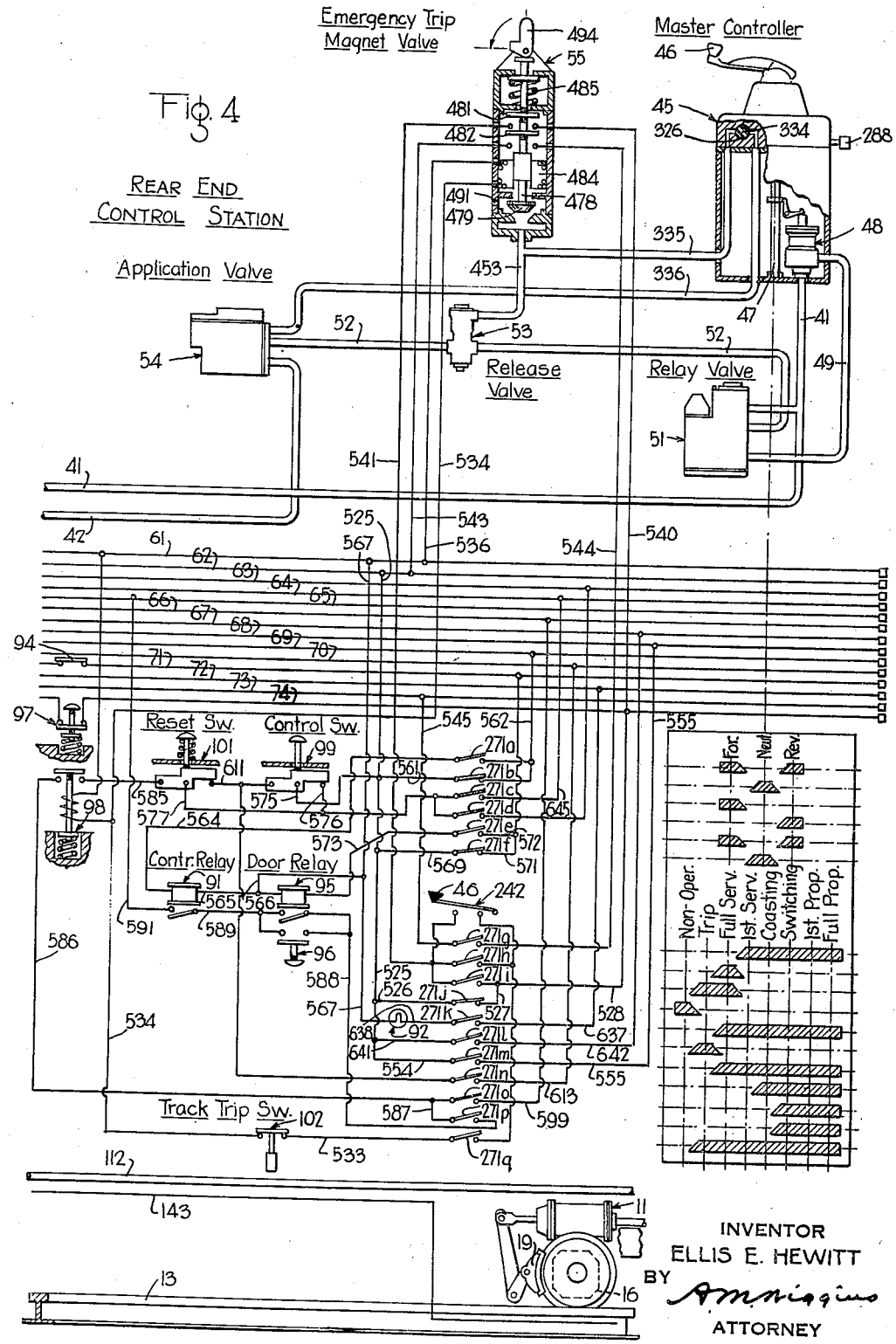

As shown in Figs. 2 and 4, a coil spring is fixed at the opposite ends thereof to the bell-crank levers 159 and 160 in a manner to bias the arms of the bell-crank levers toward each other and in substantial engagement with opposite ends respectively of the lug 158 on the crosshead 155. The spring 168 thus becomes tensioned upon the rocking of either bell-crank 159 or 160 out of its normal position by movement of the crosshead 155 and thus exerts a positive force holding the other bell-crank in its normal position. Thus, when the bell-crank 159 is rocked in a counterclockwise direction, as seen in Fig. 2, due to the movement of the crosshead 155 in the left-hand direction, the spring 168 becomes tensioned and exerts a force on the bell-crank 160 tending to urge it in a counterclockwise direction. Due to the engagement of the arm 166 of gear segment 163 with the fixed stop 167, the shaft 36a of the propulsion controller 36 is accordingly positively maintained in its normal position.

In addition to the spring 168, another coil spring 171 is provided for biasing the operating gear segments 163 of the brake controller 35 and the propulsion controller 36 to the normal positions thereof. The spring 171 is interposed yieldingly between the fixed support 161 and a collar on a rod 172 that is pivotally connected to the outer end of a lever 173 that is in turn pivoted at the opposite end thereof on the supporting pin 164 for the gear segment 163 of the brake controller 35. The lever 173 has a pair of laterally extending arms 174 respectively adapted to engage the two gear segments 163 for the brake controller 35 and for the propulsion controller 36 respectively at a point above the pin 164 on which the gear segments are pivoted. Thus the spring 171 yieldingly resists the rocking of the gear segments 163 in one direction out of the normal position thereof and urges the gear segments in the opposite direction towards the normal position thereof.

The crosshead 155 is shifted by unbalancing fluid pressure forces on opposite sides of an operating piston, not shown, contained in the cylinder 156, and stopped in any position by balancing the fluid pressure on opposite sides of the piston. A pilot valve 176 of the slide valve type, adapted to be operatively controlled by a pressure responsive device 177, functions to unbalance and automatically balance the fluid pressure forces on the operating piston in the cylinder 156 according to the pressure of fluid in the control pipe 42 acting on the pressure responsive device 177 through a branch pipe 178.

With the normal pressure of for example forty-five pounds per square inch established in the control pipe 42, the crosshead 155 occupies its normal position shown so that the operating shafts of the brake controller 35 and of the propulsion controller 36 are biased to the normal positions thereof, that is, to the "coasting" position indicated in Fig. 5.

Upon the reduction of the pressure in the control pipe 42 to a value such as thirty-five pounds per square inch, the crosshead 155 of the actuator 37 is shifted in the left-hand direction from the position shown, thereby rocking the bell-crank 159 and causing corresponding movement of the operating shaft of the brake controller 35 to a position corresponding to the "first service" position of the master controller handle 46. Upon a further reduction of the pressure in the control pipe 42 to a value such as ten pounds per square inch, the crosshead 155 is further shifted in the left-hand direction and automatically stopped in a position such that the operating shaft of the brake controller 35 is shifted to and stopped in a position corresponding to the "full service" position thereof of the controller handle 46.

If the pressure in the control pipe is again increased to its normal pressure of forty-five pounds per square inch, the coil springs 168 and 171 become effective to restore the operating shaft of the brake controller 35 to the normal position thereof.

If the pressure in the control pipe 42 is increased from the normal pressure to a value such as fifty-five pounds per square inch, the crosshead 155 is shifted in the right-hand direction to rock the bell-crank 160 in a clockwise direction, as seen in Fig. 2, and thus correspondingly rotarily shift the operating shaft 36a of the propulsion controller 36 to a position corresponding to the "switching" position of the controller handle 46. In a similar manner, an increase of the pressure in the control pipe to a value such as sixty-five pounds per square inch causes the crosshead 155 to be further shifted in the right-hand direction and automatically stopped in a position such that the operating shaft of the propulsion controller 36 occupies a position corresponding to the "first propulsion" position of the controller handle 46. Likewise upon a still further increase in the pressure in the control pipe to a value such as eighty pounds per square inch the crosshead 155 is still further displaced in the right-hand direction from the normal position and the operating shaft of the propulsion controller still further displaced to a position corresponding to the "full propulsion" position of the controller handle 46.

It will be apparent therefore that the actuator 37 selectively operates one or the other of the controllers 35 and 36 and since it can operate only one of the controllers at one time automatically prevents interference between the propulsion and braking circuits. Thus it is impossible to produce a brake application without automatically restoring the propulsion controller to its coasting position in which the supply of propulsion current to the motors is interrupted. In a similar manner it is also impossible to allow a brake application to be in effect while attempting to propel the vehicle and thus overloading the driving motors.

(d) *Master controller 45*

The master controller 45 is shown diagrammatically in Figs. 1 and 4. The actual details of structure are shown in Figs. 6 to 19 and in view of the fact that the master controller constitutes one of the features of my invention it will be described in detail.

As shown in the vertical sectional view of the master controller in Figs. 6 and 7, the master controller is of the pedestal type adapted to be mounted in an upright position in the control cab or station of a car. The master controller comprises a supporting base in the form of a steel channel member 185 having side flanges 186 and, secured to the web of the channel member 185 midway between the two flanges 186, another steel channel member 187.

At the lower end of the channel member 185 is a base plate 188 suitably attached, as by welding, to the channel member 185. Supported in the base plate 188 is a bearing member 189 of the ball-bearing type in which the lower end of the operating shaft 47 of the controller is rotarily supported and held in a position substantially midway between the flanges of the centrally disposed channel member 187.

The operating shaft 47 is supported and guided at its upper end by a bearing plate 191 that has a hub portion 192 provided with a sleeve bearing 193 through which the shaft 47 extends. The bearing plate 191 is secured to a portion 194 of the casing, made of cast iron or aluminum, that is bolted or screwed to the upper end of the supporting channel member 185. As shown in Fig. 9, the bearing plate 191 is provided with three circular holes 195 into which dowel pins 196 formed on the casing member 193 extend, thus accurately positioining the bearing plate. A plurality of screws 197 are provided for securing the bearing plate to the casing member 194.

Another casing member 199 complementary to the casing member 194 is attached to the upper surface of the casing member 194 as by a bolt or screw 201 accessible from the outside and several other screws not shown.

The casing member 199 is U-shaped in plan view, (see Fig. 18) being open at the bottom and formed so as to cover the central opening 203, in the upper surface of the casing member 194, through which the upper ends of the operating shaft 47 projects. The upper surface of the casing member 199 is provided with a circular opening 204 in which is received a spherical portion 205 formed on the end of the operating handle 46 for attachment to the upper end of the operating shaft 47 which projects upwardly through the central opening 204.

As shown in Fig. 6, the casing member 199 has an integrally formed hub 206 that is attached by a plurality of webs 207 to the wall of the casing member in a position such that the operating shaft 47 extends therethrough.

Vertically slidable in the hub 206 is a bushing member 208 that is provided at the lower end thereof with a flange 209 that extends radially outward from the shaft 47.

Interposed between the upper end of the hub portion 192 of the bearing plate 191 and a shoulder formed on the interior of the bushing 208 is a coil spring 210 that urges the bushing upwardly to effect engagement of the flange 209 with the lower end of the hub 206.

Fitting closely in slidable relation over the upper end of the operating shaft 47 is a collar 212, the outer circular surface of which fits closely and slidably within the inner circular opening of the bushing 208 (Fig. 8). A pin 213 extends diametrically through a suitable hole in the shaft 47 and cooperating holes in the walls of the collar 212 for securing the collar 212 to the shaft 47. The bushings 208 is provided with elongated openings 214 at diametrically opposite points therein through which the opposite outer ends of the pin 213 extend, suitable washers 215 and cotter pins 216 being provided on the ends of the pin 213 for holding it in position.

The collar 212 is provided with two oppositely extending arms 217 and 218 respectively that are substantially perpendicular to the pin 213 and are received in suitable notches or recesses 219 in the upper end of the wall of the bushing 208. The end of the arm 217 on the collar 212 is received between a pair of lugs 221 formed on the inner surface of the spherical portion 205 of the operating handle 46 and a screw 222, inserted transversely from the outside of and through the wall of the spherical portion 205, extends through the lugs 221 and a suitable bearing 223 provided in the arm 217 to provide a pivot for the operating handle.

On the inner surface of the spherical portion 205 is formed a pair of lugs 225 that are so located as to engage the upper end of the bushing 208 on diametrically opposite sides of the operating shaft 47. Thus when the outer end of the controller handle 46 is pressed downwardly by the operator, the bushing 208 is correspondingly urged downwardly against the yielding resistance of the spring 210 and, conversely, when the outer end of the handle is released, the spring 210 returns the handle upwardly to the position shown in Fig. 6. This movement of the operating handle provides the well-known "deadman" feature as will be explained more fully hereinafter.

It will be seen that the elongated openings 214 in the bushing 208 permit the bushing 208 to be shifted downwardly with respect to the operating shaft 47 but, due to the pin 213 extending in close fitting relation through the openings 214, the bushing 208 is fixed to rotate with the operating shaft 47 at all times.

The flange 209 on the bushing 208 has a V-shaped projection 227 thereon, one surface 228 of which is so disposed as to engage a cooperating surface on a stop lug 229 formed on the bearing plate 191 to limit the rotation of the operating shaft 47 in a counterclockwise direction, as seen in Fig. 9. As will be apparent hereinafter, this position corresponds to the "non-operative" position of the controller handle 46.

In order to prevent the accidental and undesired rotation of the controller handle 46 beyond the "full service" position thereof, a blocking lever 231 is suitably pivoted, as on a screw 232 screwed into a boss 233 formed on the inner surface of the casing member 199. The lever 231 is normally biased by a coil spring 234 (see Fig. 10) to a position in the plane of rotation of the flange 209 of the bushing 208 so that the edge of the lever is engaged by the surface 228 on projection 227 of the flange 209 and thus prevents the movement of the controller handle 46 beyond its "full service" position.

In order to enable the movement of the controller handle 46 beyond its "full service" position in a counterclockwise direction, as seen in Fig. 9, a plunger 235 that operates in a suitable bore 236 in the casing member 199 and that projects above the upper surface of the casing member 199 sufficiently to be depressed by the operator is arranged so that when depressed by the operator, it engages an arm of the lever 231 and rocks the lever 231 in a clockwise direction, as seen in Fig. 10, to a position out of the plane of movement of the flange 209 on the bushing 208. It will thus be seen that unless the operator depresses the plunger 235, the controller handle 46 cannot be shifted beyond its "full service" position. As will be brought out more clearly hereinafter, the "trip" position of the controller handle 46 is located between the "full service" position and the "non-operative" position (see Fig. 18) and the blocking lever 231 thus positively prevents the undesired operation of the controller handle to "trip" position unless the operator definitely intends such movement of the controller handle.

As seen in Figs. 6 and 9, the bearing plate 191 is also provided with a stop lug 238 that is adapted to be engaged by another surface 239 of the projection 227 on the flange 209 of the bushing 208 when the controller handle 46 is shifted in a counterclockwise direction from the position shown in Fig. 9. As will be seen later, the position of the controller handle as limited by the engagement of the projection 227 with the stop lug 238 corresponds to the "full propulsion" position of the controller handle. As will be explained more fully hereinafter, the controller handle 46 passes successively through the "switching" and "first propulsion" positions thereof in shifting from the "coasting" position, in which the parts are shown in Fig. 9, to the "full propulsion" position.

The flange 209 of the bushing 208 cooperates with one end of a pivoted switch lever 241 of a switch device hereinafter designated the deadman switch 242. As seen in Figs. 9 and 11, with the controller handle 46 released and the bushing 208 correspondingly urged to its uppermost position, the flange 209 causes the switch lever 241 to be rocked in a clockwise direction to effect disengagement of a contact-bridging member 243 fixed in insulated relation on the opposite end of the switch lever from a pair of contact members 244 suitably carried on an insulating block 245 mounted on the inner wall of the casing member 199. When the controller handle is depressed, the flange 209 on the bushing 208 assumes a position indicated by the broken lines, and a coil spring 246 interposed between the bearing plate 191 and the contact arm of the switch lever 241 urges the switch lever in a counterclockwise direction to effect the engagement of the contact-bridging element 243 with the contact members 244, thus closing the switch.

The various operating positions of the controller handle 46 are positively defined by means of a disk 251 (see Fig. 13) fixed to the operating shaft 47 and having suitable notches 252, in the peripheral edge thereof for receiving a roller 253 that is rotatably mounted on the end of a lever 254 and yieldingly biased into contact with the peripheral edge of the disk 251 by a coil spring 255.

As seen in Figs. 6 and 14, the positioning disk 251 is formed integrally with a second disk 256, the two disks being joined by an intervening boss 257 of substantially rectangular cross section. A central opening 258 of square shape extends through the disks 251 and 256 and the boss 257 for receiving a square bushing 259 that has a central bore 261 of circular cross section conforming closely to the outer circular diameter of the controller shaft 47. The bushing 259 is fixed on the shaft 47 by a transversely extending pin 262. In order to insure the disks 251 and 256 being fitted over the square bushing 259 in only one position, a pin 263 is provided in the wall of the bushing which extends into a suitable groove or slot 264 formed in the disks and connecting boss 257. Thus the disks 251 and 256 are prevented from being installed in improper angular relation to the controller handle 46.

As seen in Figs. 6 and 13, the lever 254 carrying the roller 253 is pivoted at the end opposite the roller 253 on a suitable bolt or stud 266 suitably secured in the casing member 194 in parallel relation to the controller shaft 47. The biasing spring 255 is connected at one end to a lug on the lever 254 and at the opposite end to a rod 267 that is pivoted, as on a pin 268, fixed on the inner surface or wall of the casing member 194.

A portion of the operating shaft 47 intermediate the ends thereof some distance below the casing member 194 is of square cross section for receiving thereon in interlocked relation a plurality of rotary cams 270 having central openings of square shape corresponding to the cross section of the operating shaft. As indicated in Fig. 17, each cam 270 is adapted to operate a corresponding contact finger 271 into and out of contact with a fixed contact member 272 according to the contour of the rotary cam. The contact fingers 271 are hinged in spaced parallel relation to a supporting board of insulating material 273 that is secured to one flange of the inner channel member 187, a suitable terminal post 274 being provided for connecting electrical wires to the contact fingers. In a similar manner contact members 272 are mounted on a board of insulating material 274 suitably secured to the opposite flange of the central channel member 187.

As will be seen in Fig. 17, each contact finger 271 is provided with a roller 277 that engages the peripheral edge of the rotary cam 270. When the roller 277 engages in a notch 278 in the peripheral edge of the cam, a spring 279 becomes effective to urge the contact finger 271 into engagement with the fixed contact member 272.

When the roller 277 engages the outer rim or edge of the cam 270, the finger 271 is shifted out of contact with the fixed contact member 272 against the yielding force of the spring 279. If desired, a yielding contact tip 281 having an associated biasing spring 282 may be provided on the contact fingers 271, in the manner shown, thereby enabling an electric wire 283 to be connected directly to the contact tip 281 and avoiding the necessity of electric current passing through the contact finger 271 itself.

The specific contour of each of the rotary cams 270 will be apparent from the diagrammatic development view of the controller cams shown in Figs. 1 and 4. Following the same method employed in connection with the brake and propulsion controllers 35 and 36, each rotary cam 270 is represented by a corresponding cam element and the contact finger operated by the cam is located in a horizontal line opposite the cam element. When the controller handle 46 is in a position covered by the cam element, the corresponding contact finger is in closed position. Conversely, when the controller handle is in a position not covered by the cam element, the corresponding contact finger is in open position.

For convenient reference, the series of contact fingers 271 descending from the top are identified in Figs. 1 and 4 by the reference numerals 271 and the suffix letters "g" to "q" respectively. Only eleven contact fingers 271g to 271q are shown in Figs. 1 and 4 while thirteen rotary cams 270 are shown in Figs. 6 and 7. This apparent discrepancy is due to the fact that the two rotary cams 270 at the bottom of the series and the associated contact fingers are not employed in the control system disclosed in Figs. 1 to 4. The two extra rotary cams 270 are provided so as to be available for any desired future use.

By way of illustration, now, consider the uppermost rotary cam 270. As seen in Fig. 1 the cam element corresponding thereto covers the "coasting" position of the controller handle 46, and with the controller handle in "coasting" position as assumed, the contact finger 271g is thus shown in closed position. In Fig. 4, the controller handle is in "non-operative" position and since the uppermost cam element of the cams 270 does not cover the "non-operative" position, the associated contact finger 271g is shown in open position.

The function of the contact fingers 271g to 271q will be made apparent in the subsequent description of an assumed operation of the equipment. For the present, it is sufficient to state that these contact fingers function in connection with the braking and propulsion circuits.

As previously intimated, the master controller 45 has embodied therein a master reverser. As seen in Fig. 6, the master reverser parts include a reverser disk 285 having a tubular sleeve 286 attached in a central position thereto as by welding, the controller shaft 47 being adapted to extend through the sleeve and disk. On the lower surface of the reverser disk 285 is fixed a yoke bracket 287 between the two arms of which is received the inner end of a reverser handle 288 that projects out of the side of the casing member 194 through an opening 292. A coil spring 289 interposed between the underside of the reverser disk and the reverser handle 288 biases the reverser handle downwardly, thus necessitating the lifting of the reverser handle to override projections 291 on the lower side of opening 292 in order to shift the reverser handle to its different operating positions.

The reverser handle 288 has three positions, designated respectively "Forward," "Reverse" and "Neutral." As seen in Fig. 13, the reverser handle 288 is shown in the "forward" position thereof. When the handle 288 is shifted in a counterclockwise direction over the first lug 291 the handle enters the "neutral" position thereof. Further shifting of the reverser handle in a counterclockwise direction over the second lug 291 causes the handle to enter the "reverser" position thereof.

In order to insure that the reverser handle 288 be moved positively into the "forward" or "reverse" positions thereof, an arrangement is provided, as shown in Fig. 12 for yieldingly resisting the rotation of the reverser disk 285. As shown in Fig. 12, the tubular sleeve 286 attached to the reverser disk 285 is provided with a radially extending tongue 294 which is adapted to engage one or the other of two crossed levers 295 that have a common pivot pin 296 attached to an upper base plate 297 just beneath the casing member 194. A coil spring 298 is connected at its opposite ends to corresponding ends of the two crossed levers 295 to cause the opposite ends of the levers to engage diametrically opposite sides of a stop pin 299 formed on the upper base plate 297.

When the reverser handle 288 is in its "neutral" position, the tongue 294 is in line with the axis of the controller shaft 47 and the stop pin 299. When the reverser handle is shifted to the "forward" position thereof, the tongue 294 engages the left-hand lever 295, as seen in Fig. 12, and rocks it on the pivot pin 296 against the yielding resistance of the spring 298, the other lever 295 being held against rotation due to the engagement of the free end thereof with the pin 299. Similarly, if the reverser handle 288 is shifted from the "neutral" position to its "reverse" position, the tongue 294 is shifted in a counterclockwise direction, as seen in Fig. 12, to engage the free end of the right-hand lever 295 to correspondingly rock the lever against the resistance of the spring 299.

It will thus be apparent that the reverser handle 288 must be moved fully past the intervening lug 291 between "neutral" position and either "forward" or "reverse" position so that the lug may hold the lever displaced out of "neutral" position against the force of the spring 298. Thus positive and full movement of the reverser handle to either "forward" or "reverser" position is assured.

The tubular sleeve 286 attached to the reverser disk 285 has an outer contour of square cross section and a plurality of rotary cams 300, having conforming central square openings, are received over the sleeve and correspondingly locked thereto for rotation with the reverser disk. The rotary cams 300 are adapted to operate respectively associated contact fingers 271 in a manner similar to that of the rotary cams 270.

The specific contour of the different reverser cams 300 will be apparent from the diagrammatic development view thereof shown in Figs. 1 and 4. Just as in the case of the rotary cams 270, so in the case of the cams 300, the cams are indicated by cam elements and the contact fingers operated by the cams are in horizontal line opposite the respective cam elements. When the reverser handle 288 is in a position covered by a cam element, the corresponding contact finger is in closed position. Conversely, when the reverser handle 288 is in a position not covered by a cam element, the corresponding contact finger is in open position.

For convenience, the contact fingers assoicated with the rotary reverser cams 300 are identified in Figs. 1 and 4, descending from the top cam, by the reference numeral 271 with the suffix letters "a" to "f", inclusive, respectively. The function of the contact fingers 271a to 271f will be made clear in the subsequent description of the operation of the equipment.

A suitable bearing member 301, preferably of the ball type as shown, is provided between the uppermost rotary cam 270 and the lower end of the tubular sleeve 286 of the reverser disk 285 to afford the necessary vertical support for the reverser disk, sleeve 286 and the rotary cams 300 attached thereto.

In order to prevent the accidental or unintended operation of the reverser handle 288 out of any of its positions except when it is safe to do so, the reverser handle is positively locked against movement in all positions of the controller handle 46 except the "non-operative" position. To accomplish this, the reverser disk 285 is provided with three rectangular notches 303 (Fig. 15) into which a locking finger 304 formed on or attached to the end of a lever 305 is adapted to be received. The lever 305 is pivoted on the bolt 266 immediately below the lever 254 and, at the end having the locking finger 304, it is formed as a clevis in which a roller 306 is rotatably mounted. The roller 306 is adapted to engage the outer peripheral cam surface of the disk 256 formed integrally with the positioning disk 251.

The peripheral cam surface of the disk 256 has a cam 307 formed thereon in such a position as to engage the roller 306 and shift it radially outwardly from the controller shaft 47 only when the controller handle 46 reaches the "non-operative" position thereof. When the roller 306 is shifted radially away from the controller shaft by the cam 307, the locking finger 304 is shifted correspondingly outward so as to clear the rim of the reverser disk 285 and thus permit rotation of the disk by shifting the reverser handle 288 to a desired position. In Fig. 15, the reverser disk 285 is shown in the position corresponding to the "forward" position of the reverser handle 288 and, accordingly, since the disk 256 is in a position corresponding to the "coasting" position of the controller handle 46, the locking finger 304 is received in the notch 303 that corresponds to the "forward" position of the reverser handle.

The lever 305 is yieldingly biased in a direction to maintain the roller 306 in contact with the rim of the disk 256 by a coil spring 309. One end of the spring 309 is secured to a lug formed on the lever 305 and the other end is secured to a similar lug formed on another lever 311 that is pivoted on the pivot bolt 266 immediately below the lever 305. The lever 311 has a clevis at the outer end thereof in which is rotatably mounted a roller 312, the roller being rotatable in the plane of the reverser disk 285. It will thus be seen that a single spring 309 serves to yieldingly bias the rollers 306 and 312 into contact with the rim of the respectively associated disks 256 and 285.

In order to prevent the operation of the controller handle 46 out of its "coasting" position into a propulsion position if the reverser handle 288 is in its "neutral" position, the lever 311 is provided with a locking finger 313 (Fig. 14) at one side of the roller 312 which is adapted to be swung into the path of movement of a shoulder 314 formed at the outer periphery of the disk 256 when the reverser handle 288 is in its "neutral" position. In order to effect movement of the locking finger 313 into and out of the path of movement of the shoulder 314 on the disk 256, the reverser disk 285 is provided with a pair of cams 315 arranged in spaced circumferential relation and adapted to engage the roller 312 so as to shift the lever 311 pivotally on the bolt 266 as seen in Figs. 13, 14 and 15. When the reverser handle 288 is in its "neutral" position, the position of the reverser disk is such that the roller 312 on the lever 311 is received in the notch 316 formed between the two cams 315, and the spring 309 accordingly biases the lever 311 radially inwardly toward the controller shaft 47 to move the locking finger 313 into path of the shoulder 314. As seen in Fig. 14, the disk 256 is in the position corresponding to the "coasting" position of the controller handle 46 so that with the locking finger 313 in the path of movement thereof, the disk 256 and correspondingly the controller handle 46 is blocked against rotation in a clockwise direction.

It will thus be seen from Fig. 18 that with the reverser handle 288 in its "neutral" position, the controller handle 46 cannot be operated out of "coasting" position in a clockwise direction into the propulsion zone.

Since the controller handle 46 and the reverser handle 288 remain on the controller at all times while the equipment is in service, it is necessary to provide some mechanism for locking the controller handle and reverser handle against undesired operation when the operator leaves the control station at which the master controller 45 is located, for some reason such as changing ends or at the end of a service run. Since the equipment is of the double-end type, it is also necessary to provide some means for closing the end of control pipe 42 at the control station opposite to that at which the operator is located. As seen in Fig. 13, I have provided a novel arrangement whereby these two necessary functions are performed by a combined valve and locking mechanism 325.

The mechanism 325 comprises a plug type valve or cock 326 provided with a stem 328 with which a removable operating lever 329, in the form of a wrench, is adapted to cooperate to effect rotation of the valve 326 to either of two positions. The plug valve 326 has a tapered body which is adapted to be seated on a correspondingly tapered bushing 331, secured in a suitable bore in the casing member 194 open to the back side of the controller 45. A coil spring 332 is interposed between the outer end of the plug valve 326 and a screw plug 333, screwed into the outer threaded end of the bore that receives the valve bushing 331, and urges the plug valve 326 into sealing contact with the bushing 331.

The body of the plug valve 326 is provided with a suitable port or cavity 334 therein for opening and closing communication between two pipes 335 and 336, as shown in Figs. 1 and 4, leading respectively to the emergency trip magnet valve 55 and to the application valve 54 for a purpose which will be explained hereinafter.

As shown in Fig. 13, the inner end of the stem 328 of the plug valve 326 is journaled in a suitable bearing formed on the inner surface of the casing member 194 and, fixed to the stem 328 adjacent the bearing 337, is a locking latch or pawl 338. The latch 338 is fixed on the valve stem 328 in such manner that when the locking lever 329 is operated downwardly to the position designated "Unlock" position in Fig. 6, a finger 339 on the latch 338 is shifted above the disk 251 thus enabling rotation of the disk 251 and consequently operative movement of the controller handle 46.

Since it is desired to have the controller handle locked in its "non-operative" position and the reverser handle 288 in its "neutral" position, the disks 251, 256 and 285 are severally provided with rectangular notches or slots 341, 342 and 343 respectively (Figs. 13, 14 and 15), cut radially inward from the outer periphery of the disks and adapted to be moved into vertical alignment or registry to receive the latch finger 339 when the controller handle 346 is in "non-operative" position and the reverser handle 288 is in "neutral" position.

Figure 19:
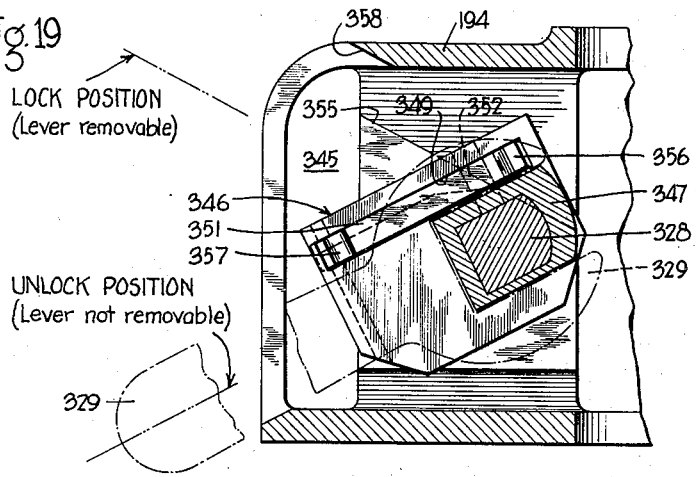

In order to prevent removal of the locking lever 329 except when the latch 333 is in a position to lock the controller handle 46 and the reverser handle 288 against movement, a locking device 345 is provided for the locking lever 329 as shown in Figs. 13 and 19. This locking device comprises a base block 346, fixed on the valve stem 328 as by having a square opening conforming to a square portion of the stem 328, the block 346 having a square portion 347 of reduced cross section connecting two spaced flanges 348 arranged perpendicularly with respect to the valve stem 328. The locking lever 329 extends through a suitable vertical slot 358 in the side of the casing member 194 and interlocks with the square portion 347 to cause turning of the valve stem 328, as indicated by the broken lines in Fig. 19.

One of the flanges 348 has a slot 349 cut therein in which is received a locking pawl 351, the pawl 351 being pivoted on a pin 352 fixed in the flange 348 and extending across the slot 349.

The casing member 194 has a partition or wall 354, through which the valve stem 328 extends, located between the locking latch 338 and the base block 346 and having a surface closely adjacent to the flange 348 carrying the locking pawl 351. The wall 354 has a portion cut away on a line 355 (see Fig. 19) so that when the locking lever 329 is in its upper or "lock" position, the locking pawl 351 is free to rock on its pin 352.

The locking pawl 351 is provided at the opposite ends thereof with projecting cams 356 and 357 that project into the path of the locking lever 329 as it is inserted through the slot 358 in the side wall of the casing member 194. If the locking pawl 351 is free to pivot on its pin 352, the jaw portion of the locking lever 329 engages the cam 357 and rocks the locking pawl 351 inwardly to permit the locking lever to be further inserted inwardly. When the jaw portion of the locking lever 329 is received on the square portion 347 of the base block 346, the jaw portion of the lever engages the cam 356 at the other end of the locking pawl 351 and rocks the pawl 351 back to its original position. As long as the locking lever 329 remains in the "lock" position, it may be inserted and removed at will because when the lever is moved outwardly, the jaw portion of the locking lever engages the cam 357 and rocks the locking pawl 351 so as to permit removal of the locking lever 329. If the locking lever 329 is turned downwardly to its "unlock" position, as shown in Fig. 19, the wall 354 prevents the rocking of the locking pawl 351 when the locking lever is pulled outwardly and consequently the cam 357 is in the path of the jaw portion of the locking lever and prevents removal of the locking lever.

As will be explained more fully hereinafter, it is desirable to insure the maintenance of the controller handle 46 in its "trip" position for a short length of time, when locking the controller handle 46 in its "non-operative" position at the end of a service run or when changing ends in order to insure the tripping of the master circuit breaker 85 and thus prevent unnecessary drainage of current from the storage batteries 77 due to the supply of current to the magnetic track brakes 14. For this purpose, a blocking member or idler 361 is provided between the disks 251 and 256, as shown in Figs. 13 and 14. The blocking member 361 is substantially triangular in shape and is pivoted at one apex on a pin 362 that is fixed at opposite ends in the two disks 251 and 256 in a position parallel to the controller shaft 47.

A plunger 364 contained in a suitable bore 365, in the boss 257 between the two disks 251 and 256, is biased by a spring 370 surrounding the plunger within the bore 365 into engagement with one edge of the blocking member 361 and serves to yieldingly maintain it against a stop pin 363 fixed to the disks 251 and 256. As will be seen in Fig. 14, the blocking member 361 is adapted to cover the slot 342 in the disk 256 when engaging the pin 363.

As will be seen in Fig. 13, the slot 341 in the disk 251 is wider than the slot 342 in the disk 256 and the relative positions of the two slots 341 and 342 on the disks is such that only when the disks 251 and 256 are in a position corresponding to "trip" position of the controller handle 46 can the latch finger 339 be moved through the slot 341 into contact with the upper surface of the lower disk 256 at one side of the blocking member 361. Once the latch finger 339 is shifted downwardly, by movement of the locking lever 329 upwardly from the "unlock" position thereof, into engagement with disk 256 further operation of the controller handle 46 from "trip" position toward and into "non-operative" position causes the blocking member 361 to be shifted in a clockwise direction on its pivot pin 362 so as to uncover the slot 342 in the disk 256.

It will thus be seen that it is necessary for the operator to remove his hand from the controller handle 46 momentarily, before shifting the controller handle 46 from "trip" position to "non-operative" position, in order to operate the locking lever 329 upwardly as far as possible at that time. This interval of time is sufficiently long to insure the proper tripping operation of the master circuit breakers 85 on all units of the train.

Since as previously described, the reverser handle 288 must be in its "neutral" position to place the slot 343 in the reverser disk 285 in vertical alignment with the slots 341 and 342 in the two disks 251 and 256 and thus permit the locking handle 329 to be shifted the full extent upwardly to the "lock" position thereof, the operation of the reverser handle 288 to its "neutral" position is positively insured because unless the reverser handle 288 is in its "neutral" position, the locking lever cannot be removed from the controller.

As previously stated, the master controller 45 further includes the self-lapping valve 48 which is arranged to be operated by rotation of the controller shaft 47. The specific manner of mounting and the structural details of the self-lapping valve 48 are shown in Figs. 7 and 16.

electromagnet winding 484 of the emergency trip magnet valve 55 at the head end control station, and a wire 536 to the negative battery wire 61. The other branch of the circuit extends from the point 535 by way of a wire 537, magnet winding of the emergency switch device 98, and a wire 538 to the negative battery wire 61.

Upon energization of the electromagnet winding 484 of the emergency trip magnet valve 55 at the head end control station, the valve 479 is actuated to seated position and contact members 481 and 482 to circuit-closing position. Contact member 481 establishes a self-holding circuit for electromagnet winding 484 which holds the electromagnet winding 484 energized after the controller handle 46 is shifted out of "full service" position toward the "coasting" position. The self-holding circuit extends from the positive battery wire 62 at the rear end control station to the conductor's wire 74 in the manner previously traced, thence by way of a branch wire 540 at the head end control station, contact members 481 and 486 of the emergency trip magnet valve 55, a wire 541, contact finger 271h, wires 531 and 532 and thereafter in the manner previously traced through the parallel-connected magnet windings of the emergency trip magnet valve 55 and the emergency switch device 98 to the negative battery wire 61. In order to maintain the holding circuit for the emergency trip magnet valve 55 and the emergency switch device 98, as the controller handle 46 leaves "full service" position in the direction of "coasting" position, it is necessary that the operator first depress the handle 46 so as to close the deadman switch 242. As indicated in Fig. 1, the deadman switch device 242 is connected in parallel relation to the contact finger 271h and accordingly when the contact finger 271h is shifted to its open position as the controller handle leaves "full service" position, the holding circuit previously traced is maintained through the deadman switch 242 instead of through the contact finger 271h.

The contact member 482 of the emergency trip magnet valve 55 is effective in its circuit-closing position to establish a circuit for energizing the electromagnet winding of the two emergency relays 87 on the head end unit and on the rear end unit respectively. This circuit extends from the positive battery wire 62 at the head end control station by way of a branch wire 543, contact members 482 and 487 of the emergency trip magnet valve 55 at the head end control station, a wire 544, contact finger 271g of the master controller 45 at the head end control station, which is first closed in the "first service" position of the controller handle, a wire 545 to the emergency wire 73, then in parallel through a plurality of branch circuits, one on the head end unit and one on the rear end unit, each branch circuit including a wire 546 (Figs. 2 and 3), electromagnet winding of the corresponding emergency relay 87 and a wire 547 which is connected to the negative battery wire 61.

Upon energization of the electromagnet winding thereof, each emergency relay 87 is actuated to a closed position to establish a circuit for operating the associated contactor 86 to circuit-open position. As indicated in either Figs. 2 or 3, this circuit extends from the positive terminal of the storage battery 77 on the corresponding unit by way of a wire 548, contact members 503 and 504 of the master circuit breaker 85, a wire 549, a branch wire 551 of the wire 549, a branch wire 552 of the wire 551, contact members of the emergency relay 87 in closed position, a wire 553, electromagnet winding of contactor 86 and wire 547 to the negative battery wire 61.

The master circuit breaker 85 is automatically actuated to its closed position in the "full service" position of the controller handle 46. The circuit for energizing the electromagnet winding 501 of the master circuit breaker 85 on both the head and the rear end units extends from the positive battery wire 62 at the head end control station by way of branch wire 525, a connector 554 connecting the contact fingers 271l and 271m of the master controller 45 at the head end control station, contact finger 271m, a wire 555 to the train wire 68 at the head end control station, thence through a plurality of branch circuits of the head end and rear end units, each branch circuit including a branch wire 556 of the train wire 68 (Figs. 2 and 3), electromagnet winding 501 of the master circuit breaker 85, a wire 557 and a wire 558 connected to the negative battery wire 61. Upon energization of the electromagnet winding 501 of each master circuit breaker 85, the contact members 503 thereof are actuated to their circuit-closing position and latched therein by the latch 505. It will thus be apparent that the circuit breaker 85 is positively held in closed position thereafter by the latch 505 unless opened by energization of the trip coil 506 in the manner to be hereinafter described.

Figure 21:
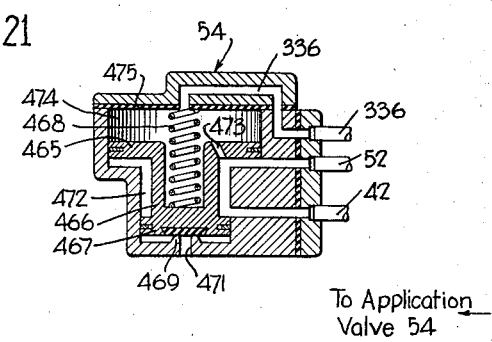

As previously explained, with the master controller handle 46 in its "coasting" position, the self-lapping valve device 48 is operative to supply fluid under pressure through the pipe 49 to the relay valve 51, which is in turn operated to supply fluid under pressure from the supply pipe 41 into the pipe 52. By reference to Fig. 20, it will be seen that the check valve 445 of the release valve 53 unseats to permit fluid under pressure to be supplied through the release valve 53 to the application valve 54, which is conditioned as indicated in Fig. 21 so as to connect the pipe 52 to the control pipe 42. Thus the control pipe 42 is charged to the normal pressure, such as forty-five pounds per square inch, with the controller handle 46 of the master controller 45 at the head end control station in its "coasting" position.

With the locking lever 329 of the master controller 45 at the head end control station in its "unlock" position, the plug valve 326 is positioned so that the pipe 326 is connected through the port 334 in the plug valve 326 to the pipe 335. Thus fluid under pressure supplied through the pipe 52 flows through the port 473 in the operating piston 465 of the application valve 54 to the chamber 474 and thence through the pipe 336, port 334 of plug valve 326, and pipes 335 and 453 to the chamber 452 of the release valve 53 at the head end control station. When the pressure in the chamber 452 of the release valve 53 is built up sufficiently, the piston 445 is actuated downwardly to seat the valve 458 and unseat the check valve 445.

Although the valve 458 is unseated originally, so that fluid under pressure supplied into the pipe 52 from the relay valve 51 may flow to atmosphere through the exhaust port 455 of the release valve 53, the valve stem 451 has such a close fit with the passage 457 that the leakage is slight and does not prevent the build up of pressure in the control pipe 42 and the supply of fluid under pressure to the chamber 452 of the release valve 53.

With the check valve 445 of the release valve 53 at the head end control station held unseated by the pressure of the fluid in chamber 452, it will be apparent that reverse flow of fluid under pressure from the control pipe 42 through the release valve 53 to the relay valve 51 may thereafter occur in response to the operation of the relay valve to reduce the pressure in the control pipe 42.

With the control pipe 42 charged to the normal pressure, the actuators 37 on the head end and rear end units are correspondingly actuated to shift the brake and propulsion controllers 35 and 36 associated therewith to the "coasting" positions thereof. As will be apparent hereinafter, with the brake controller 35 in its "coasting" position the magnetic track brake and dynamic brake circuits are interrupted so that these brakes are not applied. At the same time, the self-lapping brake valve 33 associated with each of the brake controllers 35 is conditioned to supply fluid at a maximum pressure, such as seventy-five pounds per square inch, to the relay valve 31 corresponding thereto. Each relay valve 31 is thus operated to supply a corresponding pressure through the pipes 113 and 112 to the brake cylinders 11 on the corresponding unit thereby effecting the release of the brake shoes 19.

With the propulsion controller 36 in the "coasting" position thereof, the propulsion circuits are interrupted, as will hereinafter be made apparent, and accordingly no propulsion current is supplied to the motors 15 to 18 controlled thereby.

The pressure switch 89 on each unit is actuated in response to the pressure in the brake cylinders 11 to one of its two positions in which the circuit through the train wire 69 is completed. The control relay 91 at the head end control station is accordingly energized by a circuit that extends from the positive battery wire 62 at the rear end control station by way of the branch wire 525, a branch wire 561 of the wire 525, contact finger 271b of the master controller 45 at the rear end control station, a wire 562 to the train wire 69 at the rear end control station, then through the train wire 69 to the head end control station including the series-connected pressure switches 89, then by way of a branch wire 562 at the head end control station, a branch wire 562 of the wire 562, contact finger 271a of the master controller 45 at the head end control station, a wire 564, magnet winding of the control relay 91, a wire 565, a branch wire 566, and a wire 567 to the negative battery wire 61.

It will be understood that the reverser handle 288 of the master controller 45 at the rear end control station is in its "neutral" position so that the contact finger 271b was in its closed position, whereas the reverser handle 288 of the master controller 45 at the head end control station is in its "forward" position so that the contact member 271b of the head end controller is in open position while the contact member 271a is in its closed position.

The door relay 95 at the head end control station is energized while the door relay 95 at the rear end control station is deenergized. The circuit for energizing the door relay 95 at the head end control station extends from the positive battery wire 62 at the rear end control station by way of the branch wire 525, a branch wire 569 of the wire 525, contact finger 271f of the master controller 45 at the rear end control station to the train wire 71, thence over the train wire 71 including in series relation therein the closed door switches 94 to the head end control station, a branch wire 571 at the head end control station, a branch wire 572 of the wire 571, contact finger 271e of the master controller 45 at the head end control station, a wire 573, magnet winding of the door relay 95 at the head end control station, and thence by wires 565, 566 and 567 to the negative battery wire 61.

It will be apparent that since the master controller 45 at the rear end control station is locked in its non-operative position and the locking lever 329 removed from the master controller, the corresponding plug valve 326 is in position to cut off the connection between the pipes 336 and 335. Consequently, fluid under pressure supplied into the control pipe 42 from the head end of the train is not delivered to the pressure chamber of the release valve 53 at the rear end control station. Thus the check valve 445 of the release valve 53 at the rear end control station seats to prevent the flow of fluid under pressure from the application valve 54 to the relay valve 51 at the rear end control station. At the same time, since the controller handle 46 at the rear end control station is in its "non-operative" position, the electromagnet winding 484 of the emergency trip magnet valve 55 at the rear end control station is deenergized and consequently the valve 479 is unseated so as to vent to atmosphere the chamber 452 of the release valve 53 at the rear end control station.

With the reverser handle 288 of the master controller 45 at the head end control station in its "forward" position as previously assumed, a circuit is completed for energizating the "forward" winding 81 of the local reverser 83 on the head end and on the rear end unit. This circuit extends from the positive battery wire 62 at the head end control station, by way of the branch wire 525, a branch wire 575 of the wire 525, control switch 99 at the head end control station in its operated position shown, a wire 576, a wire 577, contact finger 271c of the master controller 45 at the head end control station, a wire 578, train wire 63, and thence in two parallel branch circuits to the negative battery wire 61, each branch circuit including a branch wire 579 of train wire 63, the operating coil 81 of the local reverser 83 and a wire 581 that is connected to the negative battery wire 61 as through a ground connection in the manner shown. Although omitted from Fig. 5 for the sake of simplicity, it will be understood that each local reverser 83 is effective to establish conventional circuit connections to control the direction of rotation of the motors 15 to 18 in accordance with the energization of the "forward" winding 81 or "reverse" winding 82 of the local reverser 83 associated therewith. It will accordingly be understood that with the forward winding 81 of the local reverser 83 on the head end and rear end units energized, the motors 15 to 18 will rotate in such a direction as to drive the train in a forward direction upon the supply of propulsion current thereto in the manner to be hereinafter described.

(b) *Propulsion*

With the equipment conditioned as just described, let it be assumed that the operator desires to start the train and that he accordingly shifts the operating handle 46 of the master controller 45 at the head end control station to the "first propulsion" position. With the controller handle 46 in its "first propulsion" position, the stopped by the engagement of the upper end of the stem 451 with the inner surface of a screw plug 461 closing the chamber 452 above the piston.

The pipe 335 leading to the plug valve 326 operated by the locking lever 329 is connected into the pipe 453, as shown in Figs. 1 and 4, and fluid under pressure is supplied into the pipe 335 under the control of the plug valve 326 as will be explained more fully hereinafter when the locking lever 329 is in its so-called "unlock" position indicated in Figs. 6 and 19. The pressure of the fluid supplied through the pipe 453 to the chamber 452 of the release valve 53 exerts a force on the piston 449 which overcomes the spring 459 and shifts the piston downwardly to effect seating of the valve 458 on its associated seat and unseating of the check valve 445. This is the normal condition of the release valve 53 at the control station occupied by the operator where the master controller 45 is unlocked and effective to control braking and propulsion. With the check valve 445 unseated, it will be apparent that fluid under pressure may flow between the relay valve 51 and the application valve 54 through the pipe 52 in either direction so that the pressure in the control pipe 42 may be controlled by operation of the master controller.

Figure 20:
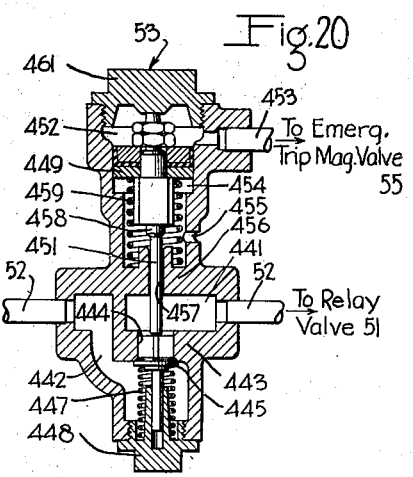

When the operator operates the locking lever 329 of the controller to its "lock" position, as when changing ends, the supply of fluid under pressure into the pipe 335 is cut off due to the shifting of the plug valve 326 to a lap position. At the same time, the emergency trip magnet valve 55 is effective to vent fluid under pressure from the pipe 453 as will be explained more fully hereinafter. When fluid under pressure is vented from the chamber 452, the spring 459 returns the piston 449 to its uppermost position as shown in Fig. 20, thus unseating the valve 458 and seating the valve 445. Communication is thus established from the chamber 441 through the passage 457 to the atmospheric chamber 454 past the unseated valve 458 to release fluid under pressure therefrom. At the same time, the pressure of the fluid communicated from the control pipe 42 through the application valve 54 to the section of the pipe 52 between the application valve and the release valve 53 cannot escape past the seated valve 445.

The application valve 54 is diagrammatically shown in sectional form in Fig. 21 and comprises a casing containing a piston 465 provided with a hollow stem 466, on the closed end of which is formed a piston valve 467. A coil spring 468, interposed between the casing and the inner surface of the tubular stem of the piston 465, yieldingly urges the piston in a direction to effect seating of the piston valve on an annular rib seat 469 to close an exhaust port 471. In this position of the piston and piston valve, the annular chamber 472 formed between the piston and piston valve connects a port to which the pipe 52 is connected to a port to which the control pipe 42 is connected. Thus fluid under pressure supplied from the relay valve 51 to the pipe 52 may flow through the application valve 54 to the control pipe 42.

The piston 465 contains a restricted port 473 which connects the annular chamber 472 to a chamber 474 at the upper side of the piston 465. Chamber 474 is connected through a passage 336 to the pipe 336 leading to the plug valve 326 that is operated by the locking lever 329 of the master controller 45.

The strength of the spring 468 is such as to maintain the piston valve 467 seated on the annular rib seat 469 when the passage 336 is closed against the exhaust of fluid under pressure therefrom, fluid under pressure flowing from the annular chamber 472 through the restricted port 473 in the piston to the chamber 474 at a sufficiently rapid rate to prevent the upward shifting of the piston in response to the supply of fluid under pressure to the annular chamber 472.

When the fluid under pressure in the chamber 474 is rapidly vented however, the port 473 restricts the flow of fluid under pressure from the annular chamber 472 sufficiently to build up a differential fluid pressure that is effective to shift the piston 465 upwardly into seated relation on a gasket seat 475. With the piston 465 seated on the gasket seat 475, the piston valve 467 is unseated from the annular rib seat 469 and at the same time cuts off communication between pipes 52 and 42 while establishing communication between the control pipe 42 and the exhaust port 471.

As long as the chamber 474 continues to be vented, fluid under pressure continues to be exhausted from the control pipe 42 through the exhaust port 471.

The emergency trip magnet valve 55, as shown in Fig. 1, is a combined switch and valve device having an operating stem 478 on which is fixed a valve 479 of the poppet type and two insulated contact members 481 and 482. An enlarged portion 483 of the stem 478 functions as a plunger that is acted upon by an electromagnet winding 484.

When the electromagnet winding 484 is deenergized, a coil spring 485 urges the stem 478 upwardly to a limit position in which the valve 479 is unseated from an associated valve seat and the contact members 481 are disengaged from respectively associated pairs of contact members 486 secured in insulated relation to the casing of the device. Conversely, when electromagnet winding 484 is energized, valve 479 is seated and contact members 481 and 482 engage their respectively associated pairs of contact members 486.

The valve 479 controls communication through a port 488 that connects a chamber 489, constantly open to atmosphere through a port 491, to a chamber 492 to which the pipe 453 leading from the release valve 53 is constantly connected.

It will thus be apparent that when the valve 479 is seated, it prevents the discharge of fluid under pressure from the pipe 453 and connected chamber 452 of the release valve 453; and that when the valve 479 is unseated, it vents fluid under pressure from the chamber 452.

As will be explained more fully hereinafter, the electromagnet winding 484 of emergency trip magnet valve 55 is adapted to be normally energized when the associated master controller is effective to control braking and propulsion and is deenergized when the master controller 45 associated therewith is not in use.

It will be seen from Fig. 1 that if the plug valve 326 of the master controller 45 is in the "unlock" position thereof establishing communication between the pipes 335 and 336, the unseating of the valve 479 of the emergency trip magnet valve 55 will vent fluid under pressure simultaneously from the operating chamber 452 of the release valve 53 and from the chamber 474 of the application valve 54.

Associated with the upper end of the operating stem 478 of the emergency trip valve 55 is a manually operable handle 494 that is normally positioned, as shown to permit the upward movement of the stem 478 in response to deenergization of the electromagnet winding 484. When the handle 494 is operated to another position, indicated by the broken line, the cam 495 formed on the handle engages the upper end of the stem 478 and shifts the steam 478 downwardly to effect the seating of the valve 479 and the engagement of the contact members 481 and 482 with their associated pairs of contact members and maintains such condition irrespective of energization and deenergization of the electromagnet winding 484. The purpose of the handle 494 is to provide an emergency means for holding the valve 479 seated and the contact members 481 and 482 in engagement with their associated pairs of contact members when due to unintended circumstances, such as accidental failure of the electrical circuit controlling the electromagnet winding 484, it is desired to cause the train to proceed notwithstanding.

(f) *Master circuit breaker 85, overload relay 105 and rheostat 106*

The master circuit breaker 85 is of conventional construction and, as diagrammatically shown in Fig. 5, comprises a solenoid winding 501 for actuating an armature 502. A contact-bridging member 503 fixed in insulated relation on the armature is adapted to engage a pair of fixed contact members 504 upon energization of solenoid 501. Suitable biasing means, such as gravity or spring means not shown, is provided for disengaging the contact-bridging member 503 from its associated contact members 504 when the solenoid 501 is deenergized.

Associated with the armature 502 is a latch or pawl 505 which is spring-biased to a position to lock the contact-bridging member 503 in circuit-closing position once it is actuated thereto, notwithstanding subsequent deenergization of the solenoid winding 501. A trip coil or solenoid 506 is effective, when energized, to release the pawl 505 to permit the armature 502 to be restored to a position in which the contact-bridging member 503 is disengaged from the contact members 504.

The overload relay 105 is of conventional type and, as diagrammatically shown in Fig. 5, comprises an operating coil or solenoid 508 which is effective when energized by excessive current in the motor circuit to actuate an armature 509 upwardly out of the normal position shown. The armature 509 carries in insulated relation thereon two contact-bridging members 510 and 511 respectively. In the normal position of the armature 509, contact member 510 engages an associated pair of contact members 512. At the same time, the contact bridging member 511 is disengaged from an associated pair of contact members 513.

When the armature 509 is actuated upwardly in response to the energization of the winding 508 by an excessive or overload current in the motor circuit, contact-bridging member 510 disengages its associated pair of contact members and the contact-bridging member 511 engages its associated pair of contact members.

Associated with the armature 509 is a latch or pawl 514 which is effective to maintain the armature in its latched position once it is actuated thereto. A reset coil 515 associated with the latch 514 is effective to withdraw the latch and permit restoration of the armature 509 to its normal position.

The contact-bridging member 511 forms an interlock switch in the circuit of the reset coil 515 which prevents energization of the reset coil except in the actuated position of the armature 509. Contact-bridging member 510 forms an interlock switch in the energizing circuit for propulsion relays 103 and 104 and prevents energization of the relays when overload relay 105 is in its actuated position.

The rheostat 106 is diagrammatically shown in Fig. 5 as having a resistor 106a and a movable contact member 106b. It should be understood that this represents in simplified form a conventional motor-operated rheostat.

(g) *Additional apparatus*

It is deemed unnecessary to specifically describe other apparatus, such as the various relays and switch devices, inasmuch as the character and the operation thereof will be apparent from the diagrammatic representation thereof.

It is also deemed unnecessary to specifically describe the control circuits at this time because these circuits will be made apparent in the subsequent description of the operation of the equipment.

OPERATION OF EQUIPMENT (a) *Conditioning of equipment*

In Figs. 1 to 4, it is assumed that the operator is stationed at the head end control station so that master controller 45 at the head end control station has its operating handle 46 in "coasting" position while the handle 46 of the master controller 45 at the rear end control station is locked in its "non-operative" position. Before being able to shift the operating handle 46 of the master controller at the head end control station to its "coasting" position, it is necessary that the operator shift the locking lever 329 of the head end controller 45 to its so-called "unlock" position, as indicated in Figs. 1, 6 and 19. Before shifting the master controller handle 46 out of its "non-operative" position, the operator first shifts the reverser handle 288 out of its "neutral" position to a desired position, assumed to be the "forward" position as indicated in Fig. 13.

As will be apparent from Figs. 1 and 18, the operating handle 46 passes through the "full service" position while being shifted to "coasting" position from the "non-operative" position. In the "full service" position of the master controller handle 46, a circuit is established for energizing the electromagnet winding 484 of the emergency trip magnet valve 55 at the head end control station. This circuit extends from the positive battery wire 62 at the rear end control station, through a branch wire 525, a wire 526, contact finger 271j of master controller 45 at the rear end control station in closed position, wires 527 and 528, conductor's wire 74 including the several conductor's switches 97, to the head end control station, thence by way of branch wire 528 at the head end control station, contact finger 271i of head end master controller 45 in closed position, a connector 529, contact finger 271h in its closed position, a wire 531, a wire 532, contact finger 271q in its closed position, a wire 533, track trip switch 102 in its closed position, a wire 534 to the point 535 where the circuit divides into two parallel branches. The one branch of the circuit extends from the point 535 by way of the wire 534, self-lapping valve device 48 of the controller is operated to increase the operating pressure supplied to the relay valve 51 which is correspondingly operated to increase the pressure in the control pipe 42 to a pressure corresponding to the "first propulsion" position such as sixty-five pounds per square inch. The actuators 37 on the head and rear end units are accordingly actuated to shift the propulsion controller 36 associated therewith to the "first propulsion" position thereof.

With the master controller handle 46 in its "first propulsion" position and the propulsion controller 36 in its "first propulsion" position, circuits are completed for energizing the two propulsion relays 103 and 104. The circuit for propulsion relay 103 extends from the positive battery wire 62 at the head end control station (Fig. 1) by way of the branch wire 525, wire 575, control switch 99 at the head end control station, wires 576 and 577, reset switch 101 at the head end control station in its normal position, a wire 585, contacts of emergency switch device 98, a wire 586, connector 587 connecting contact fingers 271o and 271p of the master controller 45 at the head end control station, contact finger 271p, a wire 588, contacts of door relay 95 now closed, a wire 589, contacts of control relay 91 now closed, a wire 591, through the train wire 65 toward the rear end control station, and thence through two parallel branch circuits on the head end and rear end units respectively. Each branch circuit extends from the train wire 65 by way of a wire 592, (Fig. 5) switch 145 of the propulsion controller 36, a wire 593, an interlock switch 132 of the brake controller 35, a wire 594, magnet winding of propulsion relay 103, a wire 595 and branch wire 596, contact members 511 and 512 of the overload relay 105, a wire 597, an interlock switch or contact on the dynamic braking relay 107 closed, as it is, only when the relay is deenergized, a wire 598, and to the negative battery wire 61 as through a ground connection in the manner shown.

The circuit for the propulsion relay 104 extends from the positive battery wire 62 at the head end control station (Fig. 1) through the control switch 99, reset switch 101 and emergency switch device 98 to the connector 587 as previously traced for relay 103, thence through the contact finger 271o of the master controller 45 at the head end control station in its closed position, a wire 599 to the train wire 66, and thence through two parallel branches on the head end and on the rear end units respectively. Each branch extends from the train wire 66, as seen in Fig. 5, by way of a branch wire 601, switch 144 of the propulsion controller 36, a wire 602, interlock switch 131 of the brake controller 35 in its closed position, a wire 603, the magnet winding of the propulsion relay 104, wires 595 and 596, and thence through the contacts of the overload relay 105 and of the dynamic braking relay 107, in the same manner as for the propulsion relay 103, to the negative battery wire 61. It will thus be observed that in order for the two propulsion relays to be energized, two train wires in the circuits therefor must be intact.

With both propulsion relays 103 and 104 energized, a circuit is completed for supplying propulsion current to the car motors 15 to 18 on the corresponding unit. The propulsion circuit extends (Fig. 5) from the trolley wire or third rail, not shown, by way of a trolley pole or collector device indicated generally at 604, a wire 605, contact members of the propulsion relay 104 closed only when the relay is energized, electromagnet winding 508 of the overload relay 105, a wire 607, and thence through two parallel branches, one branch of which includes the armature winding 15a and 16a of the motors 15 and 16 respectively and the field windings 15f and 16f of the motors 15 and 16 respectively in series relation, and the other branch of which includes the armature and field windings to the motors 17 and 18 in series relation, the two branch circuits rejoining and extending thereafter by way of a wire 608, contact members of propulsion relay 103 closed only when the relay is energized, a wire 609, rheostat 106 and returning to the external source of current through a ground connection in the manner shown.

As previously stated, well-known means (not shown) is provided whereby the degree of displacement of the propulsion controller 36 out of its normal position is effective to so control the motor operated rheostat 106 as to cause acceleration of the car motors at a corresponding rate.

With the local reverser 83 conditioned for the rotation of the motors in a direction to propel the train in a forward direction, the supply of current to the motors in the manner just described is effective to cause the train to accelerate in a forward direction.

If the operator desires to further increase the rate of acceleration, he may do so by shifting the controller handle 46 farther away from the "coasting" position toward the "full propulsion" position, the motor operated rheostat 106 being correspondingly controlled so as to cause acceleration of the motors at a correspondingly higher rate, the maximum rate of acceleration being effective when the controller handle reaches the "full propulsion" position, which also corresponds to the position for the maximum speed of travel.

If for some reason such as an attempt on the part of the operator to accelerate the train too rapidly with a heavy load on the train, the propulsion current supplied to the motors becomes excessive, the overload relay 105 is picked up and latched in its open position in which the contact member 510 interrupts the energizing circuit for the magnet windings of the propulsion relays 103 and 104.

Upon deenergization of the propulsion relays 103 and 104, the propulsion circuits previously described are interrupted and the motors accordingly coast to a stop.

With the overload relay 105 latched in open position, the contact member 511, which is then closed, conditions the energizing circuit of the reset coil 515 of the overload relay to permit energization thereof. In order to reset the overload relay, the operator first returns the controller handle 46 to its "coasting" position and then operates the reset switch 101 from the normal position shown to the other of its positions in which the circuit through the reset switch to the train wires 65 and 66 is interrupted and in which the circuit for energizing the reset coil 515 of the overload relay 105 is completed. This latter circuit extends from the positive battery wire 62 at the head end control station by way of the branch wire 525, wire 575, control switch 99, wires 576 and 577, reset switch 101, a wire 611, another wire 612, contact finger 271n of the master controller 45 at the head end control station, a wire 613, train wire 70, branch wire 614 (see Fig. 5) interlock switch 147 of the propulsion controller 36, closed only in the "coasting" position thereof to which it must first be returned in response to the operation of the master controller handle 46 to "coasting" position as previously indicated, wire 615, contact members 511 and 513 of the overload relay 105, reset coil 515 of the overload relay 105, and to the negative battery wire 61 as through a ground connection in the manner indicated. Upon energization of the reset coil 515, the latch 514 is withdrawn and the armature of the overload relay 105 is restored to its normal position in which the contact member 519 is restored to circuit-closing position and the contact member 511 to open position interrupting the energizing circuit of the reset coil 515.

With the overload relay 105 thus reset, the operator may again shift the controller handle out of "coasting" position a desired amount to effect the acceleration of the train or car motors at a rate insufficient to cause pickup of the overload relay.

(c) *Brake application*

Let it now be supposed that, with the train traveling along the road under power with the master controller handle 46 at the head end control station in one of its propulsion positions, the operator desires to bring the train to a stop. To do so the operator merely shifts the controller handle 46 back through "coasting" position to a desired braking position, such as the "first service" position.

When the master controller handle is shifted to the "first service" position, the self-lapping valve device 48 of the controller is automatically operated to reduce the pressure in the control pipe 42 to a corresponding pressure, which as previously assumed may be thirty-five pounds per square inch. The actuators 37 on the different units are thus automatically operative in response to the reduction of the pressure in the control pipe 42 to return the propulsion controllers 36 to the "coasting" position thereof and thereafter shift the brake controllers 35 to the "first service" position thereof.

As seen in Fig. 5, with the brake controller 35 in its "first service" position, a circuit is completed in response to the closing of the switch 133 of the brake controller 35 to energize the magnet winding of the dynamic braking relay 107. This circuit extends from the positive terminal of the storage battery 77 on the corresponding unit by way of the wire 548, contact members 503 and 504 of the master circuit breaker 85, wire 549, interlock contact (now closed) of the propulsion relay 104, a wire 617, the magnet winding of the dynamic braking relay 107, a wire 618, interlock contact (now closed) of the propulsion relay 103, switch 133 (now closed) of the brake controller 35, a wire 619, interlock switch 146 (now closed) of the propulsion controller 36, a wire 621, negative battery wire 61 and thence to the negative terminal of the battery 77.

Upon the energization of the dynamic braking relay 107, contacts of the relay 107 are closed to complete a dynamic braking circuit including the motors 15 to 18 of the corresponding unit. This circuit may be traced from one brush terminal of the motor armature winding 16a by way of a wire 623, magnet winding 117 of the lock-out magnet valve 32, a wire 624, one set of contacts of the dynamic braking relay 107, a wire 625, rheostat 106, a wire 626, another set of contacts of the dynamic braking relay 107, a wire 627 to one brush terminal of the motor armature winding 17a, where the circuit divides into two parallel branches, one branch extending by way of the motor armature windings 17a and 18a, motor field windings 15f and 16f to the brush terminal of the motor armature winding 16a at which the circuit was begun, and the other branch extending from the one brush terminal of the motor armature winding 17a by way of the motor field windings 17f and 18f, motor armature windings 15a and 16a to the original brush terminal from which the circuit was begun.

Although omitted for simplicity, it should be understood that suitable well-known means is provided for controlling the motor-operated rheostat 106 according to the degree of displacement of the brake controller 35 out of its "coasting" position to control the degree of dynamic braking current and accordingly the degree of dynamic braking effect.

The relation of the rotary brush device 137 to the track brake rheostat resistors 138 and 139 is such that the circuit to the magnet windings 14a of the track brake devices 14 is not completed until the brake controller 35 reaches some point between the "first service" and the "full service" positions thereof, as indicated in Fig. 18. Accordingly, with the brake controller 35 in its "first service" position, as assumed, the magnetic track brake devices are not operated.

The self-lapping brake valve 33 associated with each of the brake controllers 35 is operated correspondingly to the degree of displacement of the brake controller 35 out of its "coasting" position to effect a reduction from the maximum pressure previously supplied thereby to the relay valve 31 and this would effect a reduction from the pressure in the brake cylinders 11 except for the intervention of the lock-out magnet valve 32 which is controlled by the degree of the dynamic braking current. As long as the dynamic braking current exceeds a certain value, corresponding to a train speed of for example ten or fifteen miles per hour, magnet valve 32 is conditioned to cause fluid under pressure to be supplied from the supply pipe 41 by way of the branch pipe 41a and 124 to the pipe 122 thus shifting the valve element of the double check valve 34 to a position cutting off communication from the pipe 127 to the pipe 111 leading to the relay valve 31 and establishing a connection through which fluid under pressure is supplied from the pipe 122 to the pipe 111 leading to the relay valve 31. Accordingly, since the pressure of the fluid supplied from the supply pipe 41 is, as previously stated, of the order of one hundred pounds per square inch while the pressure in the pipe 127 reduces from the maximum of seventy-five pounds per square inch, it will be seen that the double check valve 34 is conditioned so that the fluid under pressure from the supply pipe 41 maintains the relay valve 31 in its position to maintain the maximum pressure in the brake cylinders 11 so that the brake shoes 19 remain out of engagement with the associated car wheels.

Assuming that the operator now further displaces the controller handle to the "full service" position thereof, the brush device 137 is then moved sufficiently to connect the free end of the resistors 138 and 139 and a circuit is accordingly completed for energizing the magnet windings 14a of the magnetic track brake devices 14. This circuit extends from the positive terminal of the storage battery 77 and connected positive battery wire 62 (Fig. 5) by way of the wire 548, contact members 503 and 504 of the master circuit breaker, wire 549, branch wire 141 of the wire 549, resistor 138, brush device 137, resistor 139, wires 142 and 143, and magnet windings 14a of the magnetic track brake devices in parallel to the negative terminal of the battery 77, as through a ground connection in the manner shown. The brush device 137 first connects the free ends of the resistors 138 and 139 at some point intermediate between the "first service" and "full service" positions of the controller 35, as indicated in Fig. 18, and thereafter as the rotary displacement of the brake controller 35 away from "coasting" position continues, an increasing amount of each of the resistors 138 and 139 is cut out of the circuit so as to effect a corresponding increase of the current energizing the magnet windings of the magnetic track brake devices. In the "full service" position of the brake controller 35, substantially all of the resistors 138 and 139 are cut out of the circuit and the magnet windings 14a are energized at a substantially maximum degree.

It will thus be apparent that when application of the brakes is first initiated, the dynamic brakes alone or the dynamic brakes and magnetic track brakes together are effective dependent upon the degree of the brake application.

Whenever the dynamic braking current decreases sufficiently so as to be ineffective to condition the lock-out magnet valve 32 to supply fluid under pressure to the double check valve 34 and thus to the relay valve 31, the magnet valve 32 is operated to the position closing the connection between the pipes 124 and 122 and establishing the exhaust communication through which fluid under pressure is released from the pipe 122. Accordingly, the valve element of the double check valve 34 is shifted in response to the higher pressure in the pipe 127 delivered under the control of the self-lapping brake valve 33 to a position in which the pipe 127 is connected to the pipe 111, so that the pressure of the fluid delivered under the control of the self-lapping brake valve now controls the operation of the relay valve 31.

With the master controller handle in its "full service" position, the self-lapping brake valve 33 is conditioned so as to reduce the pressure of the fluid delivered to the relay valve 31 to a relatively low value, such as ten pounds per square inch. The relay valve 31 is accordingly operated to substantially completely vent fluid under pressure from the brake cylinders 11, thus causing the spring 27 to be effective to exert their full force to apply the brake shoes 19 to the rim of the car wheels. It will be apparent that since the self-lapping brake valve 33 delivers a graduated pressure to the relay valve 31 corresponding to the degree of displacement of the operating shaft 33a out of the normal position, that the degree of force exerted by the spring 27 in the brake cylinders to apply the brake shoes 19 may be graduated in proportion to the degree of displacement of the brake controller 35 between the "first service" and the "full service" positions thereof.

It should be understood that the "full service" position of the controller handle 46 corresponds to what is usually designated emergency application position for the reason that in the "full service" position, the maximum degree of brake application is obtained.

After the train comes to a stop in response to the application of the brakes, the brake shoes 19 remain applied with a force varying in inverse degree to the degree of the pressure remaining in the brake cylinders. In a similar manner, the magnetic track brake devices 14 remain applied. With the train stopped, the dynamic braking effect entirely disappears.

To release the brakes prior to again starting the train, the operator merely shifts the controller handle 46 back to its Coasting position. The self-lapping valve 48 of the controller is accordingly effective through the relay valve 51 to restore the normal pressure in the control pipe 42. Each of the actuators 37 is thus operated to restore the corresponding brake controller 35 and self-lapping brake valve 33 to their normal positions.

Upon the restoration of brake controller 35 to its "coasting" position, the circuit for energizing the dynamic braking relay 107 is interrupted due to the opening of the switch 133 of brake controller 35. The dynamic braking circuit is therefore correspondingly interrupted by the opening of the contacts of relay 107. At the same time, the restoration of brake controller 35 to its "coasting" position causes the brush device 137 to be reversely shifted to disconnect the two resistors 138 and 139 in the magnetic track brake circuit and the magnet windings 14a and the magnetic track brake devices are accordingly deenergized. Upon deenergization of the magnet windings 14a of the magnetic track brake devices 14, the tension springs 12 are automatically effective to lift the track brake devices to their normal positions above and out of contact with the track rails.

The restoration of the brake operating shaft 33a of the self-lapping brake valve 33 to its normal position corresponding to the "coasting" position of the brake controller 35 causes the valve device 33 to again deliver fluid under pressure to the relay valve 31 at a maximum pressure, such as seventy-five pounds per square inch and the relay valve 31 is correspondingly operated to again supply fluid under pressure to the brake cylinder to effect the release of the brake shoes 19.

If for some reason, sufficient pressure is not restored in the brake cylinders 11 to effect the release of the brake shoes 19 on any of the units, the pressure switch 89 controlled according to the pressure in the brake cylinders of the corresponding unit remains in its corresponding position in which one set of contacts thereof in the circuit of the train wire 69 are in open position and the other set of contacts are in circuit-closing position. With the train wire 69 thus interrupted by one or more of the pressure switches 89, the control relay 91 cannot be energized and accordingly the contacts of control relay 91 remain in open position preventing the closing of the circuit for the propulsion relay 103. Thus, if the operator attempts to start the train while the brake shoes remain applied, no propulsion current can be supplied to the car motors because of the failure of the propulsion relay 103 to operate.

At the same time, the second set of contacts of the pressure switch 89 completes a circuit for energizing an indicating lamp 92. This circuit extends from the positive battery wire 62 (Figs. 2 or 3), by way of a branch wire 635, pressure switch 89, a branch wire 636, train wire 72 to the head end control station, thence by way of a wire 637 (Fig. 1), contact finger 211k of the master controller 45 at the head end control station, a wire 638, indicating lamp 92, and wire 567 to the negative battery wire 61.

It is thus possible for the operator to observe readily the particular unit on which the wheel brakes remain applied and take steps to cause release of the brake shoes so that the train may be safely started.

In this connection it should be noted that contact finger 271k is operated to open position in the "trip" and "non-operative" positions of the controller handle. Thus, undesired consumption of current by the indicating lamp is avoided, when the train is not in service, although the brake shoes 19 remain applied.

(d) Emergency application of the brakes

Let it now be assumed that with the train traveling along under power as described under the above section, entitled "Propulsion," the operator accidentally or intentionally releases the downward pressure of his hand on the controller handle 46, or that he runs past a signal and causes opening the track trip switch 102, or one of the conductor switches 97 is operated to open position, or that for some reason the units of the train become separated accidentally so as to interrupt the circuit through the train wires and train pipes 41 and 42.

In any of the above cases, the circuit for maintaining the electromagnet winding 484 of the emergency trip magnet valve 55 at the head end control station is interrupted so that the valve 479 is unseated and the contact members 481 and 482 shifted to circuit-opening position. With the valve 479 of the emergency trip magnet valve 55 unseated, fluid under pressure is simultaneously vented at a rapid rate from the chamber 452 of the release valve 53 at the head end control station and also, by way of the plug valve 326 of the master controller 45 at the head end control station, from the chamber 474 at one side of the operating piston 465 of the application valve 54.

Upon the rapid venting of fluid under pressure from the chamber 474 of the application valve 54, the vent valve 467 is unseated and fluid under pressure is accordingly rapidly vented from the control pipe 42 through the exhaust port 474 of the application valve 54.

The release of fluid under pressure from the chamber 452 of the release valve 53 results in the return of the piston 449 of the release valve to its upper position permitting the reseating of the check valve 445, and the unseating of the valve 458. Due to the close fit between the piston stem 451 and the bore 457, the fluid under pressure that escapes from the chamber 441 through the bore 457 to atmosphere at the exhaust port 455 is negligible. Thus fluid under pressure continues to be supplied from the relay valve 51 to the annular chamber 472 of the application valve 54 through the pipe 52, the check valve 445 being unseated by the pressure of the fluid delivered to the chamber 441 from the relay valve 51. The piston 465 of the application valve 54 is accordingly maintained seated on the gasket 475 which position it maintains as long as the chamber 474 is vented.

The fluid under pressure that escapes through the restricted port 473 in the piston 465 of the application valve 54 is likewise of negligible degree. Furthermore, the capacity of the compressor (not shown) supplying fluid under pressure to the reservoirs 43 is sufficient to maintain the pressure in the supply pipe 41 notwithstanding the leakage to atmosphere through the exhaust port 455 of the release valve and through the port 473 of the piston 465 of the application valve 54 to atmosphere through the exhaust port 491 of the emergency magnet valve 55.

The application valve 54 is accordingly operated to completely vent the control pipe 42. In the case of separation of units of the train, control pipe 42 is of course vented at the broken point also. The actuators 37 on the several units are correspondingly operated to shift the propulsion controllers 36 to the "coasting" position thereof and thereafter to shift the brake controllers 35 to the "full service" position thereof.

A "full service" application of the brakes is accordingly effected, just as if the controller handle 46 had been operated to "full service" position, except that due to the interruption of the energizing circuit of the emergency relay 87 by the opening of the contact member 482 of the emergency trip magnet valve 55, the emergency contactor 86 is operated to closed position to shunt the rheostat including the brush device 137 and resistors 138 and 139 of the brake controller 35 so that the magnet windings 14a of the magnetic track brake devices are instantly energized to the maximum degree independently of operation of the brake controller 35.

The separation of the contact member 481 of the emergency trip magnet valve and its associated contact members 486 interrupts the maintaining connection for the holding circuit of the electromagnet winding 484 of the emergency trip magnet valve 55 and thus prevents the reenergization of the electromagnet winding 484 except by movement of the controller handle 46 to the "full service" position, in which the circuit for initially energizing the electromagnet winding 484 is again set up in the manner previously described.

The emergency switch device 98 is operated to open position upon deenergization of its electromagnet winding which is connected in parallel with the electromagnet winding 484 of the emergency magnet valve 55. Consequently, the circuit for energizing the propulsion relays 103 and 104 is interrupted and the current supplied to the motors interrupted instantly without waiting for the return of the propulsion controller 36 to its "coasting" position.

As described in the previous section, entitled "Brake application," the lock-out magnet valve 32 is effective as long as the dynamic braking current exceeds a certain value, except in the case of a parting of a train or a ruptured supply pipe 41, to cause the brake shoes 19 to be held in release position and not applied until the dynamic braking current reduces below a certain value. Obviously, when the supply pipe 41 is ruptured for any reason, lock-out magnet valve 32 is ineffective to suppress immediate application of the brake shoes 19 because of failure of the fluid pressure supply from pipe 41.

In order to effect the release of the brakes, following an emergency application thereof as just described, it is necessary to shift the controller handle 46 to the "full service" position thereof in which the circuit for initially energizing the electromagnet winding 484 of the emergency magnet valve 55 is again established and the self-holding circuit for the electromagnet winding through the contact member 481 of the emergency trip magnet valve 55 again established.

If for some reason or other, such as a failure of the circuit for energizing the electromagnet winding 484 with the controller handle 46 in its "full service" position, it is desired to release the brakes and proceed with caution until the necessary circuit repairs can be effected, the handle 494 on the emergency trip magnet valve 55 may be manually operated through an angle to the second position shown to operate the valve 479 and contact members 481 and 482 to the normal position shown.

In either case, the operation of the valve 479 and contact members 481 and 482 to the position shown in Fig. 1 is effective, as described above in connection in the section entitled "Conditioning of equipment," to cause charging of the control pipe 42 to the normal pressure carried therein assuming that the controller handle is shifted to its "coasting" position.

The operator may suppress a "deadman" emergency application of the brakes, that is, he may remove his hand from the controller handle 46 and permit upward movement thereof to open the deadman switch 242, without effecting an emergency application of the brakes if the controller handle has been shifted beyond a certain point between the "first service" and "full service" positions so as to insure at least a certain percentage of the "full service" application, such as seventy-five percent. As will be apparent in Fig. 1, when the controller handle 46 reaches a certain position between the "first service" and "full service" positions the contact finger 271h is in closed position shunting the deadman switch 242. The operator may, therefore, remove his hand from the controller handle 46 and permit it to move upwardly to open the deadman switch 242 without interrupting the energizing circuit for the electromagnet winding 484 of the emergency trip magnet valve 55. Thus the emergency trip magnet valve 55 is not operated when the operator removes his hand from the controller handle 46 and consequently an emergency application of the brakes is not effected.

(e) *Changing ends*

Let it now be assumed that the operator has reached the end of a run and desires to lock the master controller 45 at the head end control station preparatory to leaving the train or preparatory to changing ends. Under the circumstances, the controller handle 46 will be in a brake application position such as, for example, the "full service" position. It will be recalled from previous description, that in a "full service" application of the brakes, the magnetic track brake devices 14 are applied, that is, current is supplied to the magnet windings thereof. In order to prevent the continued supply of current from the battery 77 to the magnet windings 14a of the track brake devices 14 while the train is out of service or for an indefinite length of time elapsing between the locking of the master controller at the head end and the unlocking of the master controller 45 at the rear end control station if the operator is changing ends, it is desirable to insure the interruption of the supply circuit to the magnet windings of the magnetic track brake devices. The master controller 45 comprising my invention is adapted to insure this result as will be presently described.

As will be apparent in Figs. 1 and 18, the "trip" position of the master controller is located between the "full service" and the "non-operative" positions, in which last position only the locking lever 329 can be removed. It is thus necessary for the operator to shift the controller handle 46 through "trip" position to "non-operative" position. In order to shift the controller handle 46 past the "full service" position toward "trip" and "non-operative" positions, the operator must first depress the plunger 235, see Figs. 9 and 18 in order to rock the blocking lever 231 and thus permit the controller handle to move past the "full service" position. It will be apparent that by necessitating the operation of the locking lever 231 positively, the undesired and accidental shifting of the controller handle beyond "full service" to "trip" position is prevented.

Having shifted the controller handle 46 to "trip" position, the operator must momentarily release the control handle 46, then grasp the locking lever 329 and pull it upwardly as far as possible. The upward movement of the locking lever 329 is limited by the engagement of the finger 339 on the latch 338, see Fig. 6, with the disk 256.

The operator then releases the locking lever 329 and shifts the controller handle 46 farther toward and into "non-operative" position, in which the notch 342 in the disk 256 is uncovered by the idler 361, thereby permitting further movement of the latch finger 339 through the disk 256.

Before again grasping the locking lever 329 and pulling it further upwardly, the operator shifts the reverser handle 288 to its "neutral" position. As previously described, the "non-operative" position of controller handle 46 is the only position thereof in which the reverser handle 288 can be shifted from one position to another. With the reverser handle 288 in its "neutral" position indicated in Fig. 13, the notch 343 of the reverser disk 285 (Fig. 15) is aligned or in register with the notch 342 in the disk 256. The operator may now pull the locking lever 329 upwardly as far as possible to the "lock" position since the finger 339 on the latch 338 may pass through the notches 342 and 343 of the disks 256 and 285 respectively.

With the locking lever 329 shifted to the "lock" position thereof, indicated in Fig. 19, it may be pulled outwardly and removed from the casing of the master controller.

The plug valve 326 operated by the locking lever 329 is correspondingly effective when the locking lever 329 is removed, to cut off the connection between the pipe 335 leading to the emergency trip magnet valve 55 and the pipe 336 leading to the application valve 54. Accordingly, the interruption of the energizing circuit of the electromagnet winding 484 of the emergency trip magnet valve 55 at the head end control station resulting from the operation of the contact finger 271q of the master controller 45 at the head end control station to open position in the "non-operative" position of the controller handle 46 is effective to cause venting of the chamber 452 of the release valve 53 but not venting of the chamber 474 of the application valve 54. The application valve 54 is thus not operated to a position venting the control pipe 42 but remains in its normal position establishing communication between the control pipe 42 and the section of the pipe 52 leading to the release valve 53.

In the "trip" position of the master controller handle 46, the contact finger 271l of the master controller is operated to closed position and establishes a circuit for energizing the trip coil 506 of each master circuit breaker 85 on the different units. This circuit extends from the positive battery wire 62 at the head end control station, (Fig. 1) by way of the branch wire 525, a branch wire 641 of the wire 525, contact finger 271*l*, a wire 642, train wire 67 toward the rear end control station, and thence in parallel-circuit relation through the trip coils of the several circuit breakers 85, each of the parallel circuits extending from the train wire 67 by way of a branch wire 643, trip coil 506, and wires 557 and 558 to the negative battery wire 61. With the circuit for energizing the electromagnet winding 501 of the master circuit breakers 85 interrupted, due to the opening of the contact fingers 271*g* of the master controller 45 at the head end control station when the controller handle 46 was shifted beyond "first service" position, the master circuit breakers 85 are accordingly tripped open and the connection between the positive terminal of the battery 77 and the control wire 549 is interrupted.

As clearly seen in Fig. 5, the master circuit breaker 85 is effective, when open, to cut off the supply of current from the battery 77 to the magnet windings 14a of the magnetic track brake devices 14 and, at the same time, the supply of current for energizing the dynamic braking relay 107 which would also constitute a drain on the battery.

It will thus be seen that by constructing and arranging the master controller 45 so as to necessitate removal of the operator's hand from the controller handle 46 momentarily in the "trip" position, in order to operate the locking lever 329 partially toward its "lock" position before permitting the controller handle to be further shifted to "non-operative" position, the completion of the energizing circuit for the trip coils 506 of the master circuit breakers 85 is assured.

It will be apparent that if the operator attempts to shift the controller handle 46 without hesitation from "full service" position to the "non-operative" position, it is impossible for him to remove the locking lever 329 because the idler 361 remains over notch 342 in the disk 256 and blocks movement of the finger 339 on the locking latch 338, operated by the locking lever 329, through the notch 342 in the disk 256.

Having thus locked the master controller 45 at the head end control station, the operator then operates the control switch 99 to the position opposite to that shown and proceeds to the rear end control station, if he is changing ends.

With both master controllers at head end and rear end control stations in their "lock" positions, it will be seen that only the brake shoes 19 remain effective to brake the train.

Let it now be assumed that the operator goes to the rear end control station for the purpose of unlocking the master controller 45 at the rear end control station. To unlock the master controller 45 at the rear end control station, the operator inserts the locking lever 329 and pushes it downwardly to the "unlock" position thereof, thus returning the latch 338 associated with the reverser disk 285 and the disks 251 and 256 to the position shown in Fig. 6. Before attempting to shift the controller handle 46 out of its "non-operative" position, the operator must first shift the reverser handle 288 to a desired position such as for example the "forward" position. If the operator does not shift the reverser handle 288 out of its "neutral" position to either "forward" or "reverse" positions, it will be impossible for him to shift the controller handle 46 beyond "coasting" position into the propulsion zone, because the lug 313 on the lever 311 of the master controller is in its inner position preventing rotation of the disk 256 and consequently rotation of the controller handle out of "coasting" position into the propulsion zone. Thus should the operator attempt to start the train, he is positively prevented from so doing unless the reverser handle 288 is in either its "forward" or "reverse" position.

With the reverser handle 288 of the master controller 45 at the rear end control station in its "forward" position, as previously assumed, a circuit is completed for energizing the reverse operating coils 82 of the local reversers 83 on the several units. This circuit extends from the positive battery wire 62 at the rear end control station (Fig. 4) by way of the branch wire 525, branch wire 474, control switch 99 at the rear end control station in its operated position (opposite from that shown), wires 576 and 577, contact finger 271c of the master controller 45 at the rear end control station now in closed position, wire 645 to the train wire 64 at the rear end control station, thence through the train wire 64 toward the head end control station and through a plurality of parallel branch circuits, each of which includes a branch wire 582 and reverse coil 82 of the local reversers 83, to the negative battery wire 61 as through the wire 581 and the ground connection indicated.

The motor circuits are thus conditioned in the same manner as for the reverse direction of travel, with the operator located at the head end control station. Thus the forward direction of travel with the operator at the rear end control station corresponds to the reverse direction of travel with the operator stationed at the head end control station.

If the reverser handle 288 is shifted to the "reverse" position, the forward coils 81 of the local reversers 83 will be energized because the contact finger 271d of the master controller 45 at the rear end control station is then in closed position and connects the positive battery wire 62 at the rear end control station to the train wire 63. Thus, the reverse direction of travel with the operator located at the rear end control station corresponds to the forward direction of travel, with the operator stationed at the head end control station.

Having shifted the reverser handle 288 to its "forward" position, the operator may now shift the controller handle 46 at the rear end control station to its "coasting" position. In so doing, the electromagnet winding 484 of the emergency trip magnet valve 55 at the rear end control station is energized and a self-holding circuit therefor established, just as previously described for the head end control station, the circuits being the same as previously described except that head end and rear end control stations are reversed, the same reference numerals being provided to designate the corresponding branch wires of the train wires at the two control stations.

With the emergency trip magnet valve 55 at the rear end control station thus properly conditioned and the plug valve 326 of the master controller 45 at the rear end control station in its "unlock" position, the release valve 53 is conditioned with the check valve 445 thereof maintained unseated. Accordingly, the relay valve 51 at the rear end control station is effective to control the pressure in the control pipe 42 in response to the operation of the self-lapping valve 48 of the master controller 45 at the rear end control station.

The equipment may now be operated under the control of the master controller 45 at the rear end control station to effect propulsion of the train or application of the brakes on the train in the same manner as previously described for operation under the control of the master controller 45 at the head end control station.

It will be observed that with the chamber 52 of the release valve 53 at the head end control station vented in the manner described, the check valve 445 is automatically seated to close the end of the control pipe 42 at the head end control station.

SUMMARY

Summarizing, it will be seen that I have disclosed a double-end type of brake and motor control system for a multiple unit vehicle including a master controller for each of the opposite end control stations. The master controller has a single operating handle adapted upon movement in one direction out of a central "coasting" position to effect the propulsion of the train and upon movement in the opposite direction out of the "coasting" position to effect the braking of the train.

The several units of the train are each provided with local propulsion and brake controllers adapted to be operated by a common actuator which selectively operates the two local controllers in response to variations of pressure in a control pipe above and below a certain normal pressure, which variations are effected in response to the movement of the controller handle. Thus assuming a normal pressure in the control pipe of forty-five pounds per square inch, a reduction of the pressure in the pipe corresponding to operation of the controller handle into the braking zone causes the actuator devices to correspondingly operate only the local brake controllers in unison. In a similar manner, an increase of pressure above the normal pressure in the control pipe causes the actuators to operate only the local propulsion controllers to control the propulsion motor on the several units in unison.

The local brake controllers on the several units control the application of dynamic brakes, magnetic track brakes and spring-applied air-released brakes associated with the car wheels. A suitable suppression magnet valve, controlled according to the current in the dynamic braking circuit, prevents the application of the spring-applied brakes until the retarding effect of the dynamic brakes falls below a certain degree.

The master controller is a particular feature of my invention and has embodied therein a master reverser which is effective to correspondingly condition local reversers on the several units.

A locking lever, only one of which is provided, may be removed from the master controller only in a one certain or "lock" position in which the reverser handle must be in its "neutral" position and the controller handle must be in its "non-operative" position.

Various interlocks are provided for insuring the proper conditioning of the master controller. For example the controller handle cannot be shifted into the propulsion zone out of its normal position unless the reverser handle is in either its "forward" or "reverse" position, operation of the controller handle into the propulsion zone thereof being positively prevented if the reverser handle is allowed to remain in its "neutral" position.

Furthermore, once the controller handle is shifted out of its "non-operative" position, the reverser handle is locked in position and cannot be shifted to any other position.

A further feature of the master controller is that the controller handle cannot be shifted beyond the position designated "full service" position, corresponding to the maximum degree of brake application, unless the operator presses a button on the top of the controller which frees the controller handle for movement into "trip" and "non-operative" positions.

A further feature of the master controller is an arrangement which insures hesitation of the controller handle in its "trip" position long enough to insure tripping of the master circuit breakers on the various units and the consequent deenergization of the magnet windings of the magnetic track brakes and the cutting out of operation of the dynamic brake relays. This feature is effected by an interlock arrangement between the controller handle and the locking lever which prevents the removal of the locking lever unless the controller handle is in "trip" position and the locking lever shifted partially toward its "unlock" position.

While I have described and shown a specific form of master controller and control system, it will be understood that various omissions, additions or modifications may be made therein without departing from the spirit of my invention. It is accordingly not my intention to limit the scope of my invention except as it is necessitated by the scope of the prior art.

Having now described my invention, what I claim as new and desire to secure by Letters Patent, is:

1. A vehicle propulsion control system comprising, in combination, a propulsion controller for controlling the supply of power to the propulsion means of the vehicle, actuating means for moving the controller to any one of a plurality of different propulsion control positions, means including a manually operative controller adapted to be operated to any one of a plurality of propulsion control positions for causing the actuating means to move the said propulsion controller to a corresponding propulsion control position, a normally closed circuit on the vehicle, and means effective upon interruption of said circuit for causing said actuating means to move said propulsion controller to a position for interrupting the supply of propulsion power to the propulsion means of the vehicle independently of the operative position of the manually operative controller.

2. A vehicle propulsion control system comprising, in combination, a propulsion controller having a certain one position in which the supply of propulsion power to the propulsion means of the vehicle is interrupted and a plurality of other positions in which power is supplied to the propulsion means, a control pipe, manually operative means for varying the fluid pressure in said pipe, actuating means controlled in accordance with the pressure in said pipe for operating the said propulsion controller to said certain one or the other of said plurality of propulsion positions, and means effective independently of the manually operative means for controlling the pressure in said pipe to cause said actuating means to operate the said propulsion controller to its said certain one position.

3. A vehicle propulsion control system comprising, in combination, a propulsion controller having a certain one position in which the supply of propulsion power to the propulsion means of the vehicle is interrupted and a plurality of other positions in which power is supplied to the propulsion means, a control pipe, manually operative means for varying the fluid pressure in said pipe, actuating means controlled in accordance with the pressure in said pipe for operating the said propulsion controller to said certain one or the other of said plurality of propulsion positions, a normally closed circuit on the vehicle, and means effective upon interruption of said circuit for so varying the pressure in said pipe as to cause said actuating means to operate the propulsion controller to its said certain one position.

4. A vehicle brake and propulsion control system comprising, in combination, a brake controller having one position in which the vehicle brakes are released and movable to a plurality of other positions to effect application of the brakes to different degrees, a propulsion controller having one position in which the supply of propulsion power to the propulsion means of the vehicle is interrupted and a plurality of other positions in which power is supplied to the propulsion means of the vehicle, a manually operative controller having a certain one position and a plurality of other positions, means controlled by said manually operative controller for causing said brake controller to be moved to its said certain one position and said propulsion controller to be moved to its certain one position when the manually operative controller is in its certain one position and effective to selectively operate one or the other of said brake and propulsion controllers to any of its other positions according to the position of the manually operative controller, a normally closed circuit on the vehicle, and means effective upon interruption of said circuit for causing said actuating means to move said propulsion controller to its certain one position and said brake controller to its position for effecting a maximum degree of application of the brakes regardless of the position of the manually operative controller.

5. A vehicle brake and propulsion control system comprising, in combination, a brake controller having one position in which the vehicle brakes are released and movable to a plurality of other positions to effect application of the brakes to different degrees, a propulsion controller having one position in which the supply of propulsion power to the propulsion means of the vehicle is interrupted and a plurality of other positions in which power is supplied to the propulsion means of the vehicle, a control pipe, manually operative means for controlling the fluid pressure in said pipe, actuating means effective in response to a certain pressure in said pipe for causing both said controllers to be operated to their certain one positions, effective in response to a reduction of the pressure in said pipe for causing said brake controller to be operated to its other positions in accordance with the amount of reduction of the pressure in said pipe below said certain pressure, and effective in response to an increase of pressure in said pipe above said certain pressure for causing said propulsion controller to be operated to its other positions in accordance with the amount of increase of pressure above said certain pressure, a normally closed circuit on said vehicle, and means effective upon interruption of said circuit for effecting a maximum reduction of the pressure in said pipe below the certain pressure for causing said propulsion controller to be operated to its certain one position and said brake controller to its position for effecting a maximum degree of application of the brakes independently of the manually operative means.

6. A vehicle brake and propulsion system comprising, in combination, a brake controller, a propulsion controller, a pipe normally charged with fluid at a certain pressure, operating means responsive to variations of pressure in said pipe, said operating means being effective in response to the said certain pressure in said pipe to cause both of said controllers to be operated to certain predetermined positions thereof in which the brakes are released and propulsion of the vehicle is stopped, effective to cause operative displacement of the brake controller out of its certain position to a degree corresponding to the degree of reduction of the pressure in said pipe below said certain pressure and effective to cause operative displacement of the said propulsion controller out of its certain position to a degree corresponding to the degree of increase of pressure in said pipe above said certain pressure, a master controller having a manually movable element shiftable to a plurality of different operating positions and a self-lapping valve means adapted to cause charging of said pipe with fluid at a pressure corresponding to the position of the operating element, a valve device operative to effect a rapid and maximum reduction of the pressure in said pipe, and means effective when the operating element of the master controller is shifted to a certain position for effecting operation of said valve device.

7. A vehicle brake and propulsion system comprising, in combination, a brake controller, a propulsion controller, a pipe normally charged with fluid at a certain pressure, operating means responsive to variations of pressure in said pipe, said operating means being effective in response to the said certain pressure in said pipe to cause both of said controllers to be operated to certain predetermined positions thereof in which the brackets are released and propulsion of the vehicle is stopped, effective to cause operative displacement of the brake controller out of its certain position to a degree corresponding to the degree of reduction of the pressure in said pipe below said certain pressure and effective to cause operative displacement of the said propulsion controller out of its certain position to a degree corresponding to the degree of increase of pressure in said pipe above said certain pressure, a master controller having a manually movable element shiftable to a plurality of different operating positions and a self-lapping valve means adapted to cause charging of said pipe with fluid at a pressure corresponding to the position of the operating element, a valve device operative to effect a rapid and maximum reduction of the pressure in said pipe, an electrical circuit adapted to be normally closed, magnet valve means operating on said circuit and effective upon interruption of said circuit to cause operation of said valve device to reduce the pressure in said pipe a maximum amount, and means effective when the manually operative element of said master controller is in a certain operative position thereof for interrupting said circuit.

8. A vehicle brake and propulsion system comprising, in combination, a brake controller, a propulsion controller, a pipe normally charged with fluid at a certain pressure, operating means responsive to variations of pressure in said pipe, said operating means being effective in response to the said certain pressure in said pipe to cause both of said controllers to be operated to certain predetermined positions thereof in which the brakes are released and propulsion of the vehicle is stopped, effective to cause operative displacement of the brake controller out of its certain position to a degree corresponding to the degree of reduction of the pressure in said pipe below said certain pressure and effective to cause operative displacement of the said propulsion controller out of its certain position to a degree corresponding to the degree of increase of pressure in said pipe above said certain pressure, a master controller having a manually movable element shiftable to a plurality of different operating positions and a self-lapping valve means adapted to cause charging of said pipe with fluid at a pressure corresponding to the position of the operating element, a valve device operative to effect a rapid and maximum reduction of the pressure in said pipe, an electrical circuit adapted to be normally closed, magnet valve means operating on said circuit and effective upon interruption of said circuit to cause operation of said valve device to reduce the pressure in said pipe a maximum amount, and switch means effective to maintain said circuit closed as long as the operator applies a downward pressure on said manually operative element of the master controller and effective to interrupt said circuit when said downward pressure is removed.

9. A vehicle brake and propulsion system comprising, in combination, a brake controller, a propulsion controller, a pipe normally charged with fluid at a certain pressure, operating means responsive to variations of pressure in said pipe, said operating means being effective in response to the said certain pressure in said pipe to cause both of said controllers to be operated to certain predetermined positions thereof in which the brakes are released and propulsion of the vehicle is stopped, effective to cause operative displacement of the brake controller out of its certain position to a degree corresponding to the degree of reduction of the pressure in said pipe below said certain pressure and effective to cause operative displacement of the said propulsion controller out of its certain position to a degree corresponding to the degree of increase of pressure in said pipe above said certain pressure, a master controller having a manually movable element shiftable to a plurality of different operating positions and a self-lapping valve means adapted to cause charging of said pipe with fluid at a pressure corresponding to the position of the operating element, a valve device operative to effect a rapid and maximum reduction of the pressure in said pipe, an electrical circuit adapted to be normally closed, magnet valve means operating on said circuit and effective upon interruption of said circuit to cause operation of said valve device to reduce the pressure in said pipe a maximum amount, and a pair of switch devices in series-related relation in said circuit, one of said switch devices being adapted to interrupt said circuit when the manually operated element of the master controller is shifted to a certain operative position thereof and the other of said switch devices being effective to interrupt said circuit upon the removal of a downward pressure applied by the operator to the operative element of the master controller.

10. A vehicle brake and propulsion system comprising, in combination, a brake controller, a propulsion controller, a pipe normally charged with fluid at a certain pressure, operating means responsive to variations of pressure in said pipe, said operating means being effective in response to the said certain pressure in said pipe to cause both of said controllers to be operated to certain predetermined positions thereof in which the brakes are released and propulsion of the vehicle is stopped, effective to cause operative displacement of the brake controller out of its certain position to a degree corresponding to the degree of reduction of the pressure in said pipe below said certain pressure and effective to cause operative displacement of the said propulsion controller out of its certain position to a degree corresponding to the degree of increase of pressure in said pipe above said certain pressure, a master controller having a manually movable element shiftable to a plurality of different operating positions and a self-lapping valve means adapted to cause charging of said pipe with fluid at a pressure corresponding to the position of the operating element, a valve device operative to effect a rapid and maximum reduction of the pressure in said pipe, an electrical circuit adapted to be normally closed, magnet valve means operating on said circuit and effective upon interruption of said circuit to cause operation of said valve device to reduce the pressure in said pipe a maximum amount, and a pair of parallel-connected switch devices in said circuit effective to interrupt said circuit only when both said switch devices are in open position, one of said switch devices being closed in response to the downward pressure applied by the operator to the said operative element of the master controller and opened in response to the removal of said downward pressure, and the other of said switch devices being closed when the operative element of the master controller is displaced to a certain position corresponding to a predetermined reduction of the pressure in the said pipe from the said certain pressure.

11. A vehicle brake and propulsion system comprising, in combination, wheel brake means having a friction element adapted to exert a retarding effect on a vehicle wheel, spring means adapted to exert a force to apply said friction element, fluid pressure responsive means for releasing said element, propulsion means for the vehicle, means for controlling said brake means and propulsion means, and means controlled by the pressure of fluid supplied to the fluid pressure responsive means to release the said friction element for rendering the last said means ineffective to control the propulsion means to start the vehicle.

12. A double-end vehicle brake and propulsion control system comprising, in combination, a pipe extending from end to end of the vehicle, a master controller at each end of the vehicle for controlling the pressure in said pipe, means controlled according to the pressure in said pipe for selectively effecting braking or propulsion of the vehicle, manually operated means associated with each of said master controllers effective in one position to lock the master controller in a non-operative position and effective in a second position to unlock the controller for operation, a valve at each end of said pipe adapted to open or close the end of the pipe, and means effective in response to operation of said manually operated means to its said one position to cause said valve to close the corresponding end of the said pipe and effective in response to operation of said manually operated means to its second position to cause said valve to open the corresponding end of said pipe.

13. A double-end vehicle brake and propulsion control system comprising, in combination, a control pipe extending from end to end of the vehicle, a master controller at each end of the vehicle, each master controller having an operating handle shiftable to different operating positions to cause fluid under pressure to be supplied into and released from the said pipe at the corresponding end of the vehicle to control the pressure in said pipe, means controlled according to the pressure in the pipe for selectively effecting either braking or propulsion of the vehicle, a one-way valve at each end of the pipe adapted to prevent the release of fluid under pressure through the corresponding end of the pipe, a normally closed circuit for each of said controllers, electroresponsive means for each controller operating on the corresponding circuit and effective as long as said circuit is closed for rendering the one-way valve at the corresponding end of the vehicle ineffective to prevent release of fluid under pressure therepast from the said pipe and operative upon interruption of said circuit for rendering the corresponding one-way valve effective to prevent the release of fluid under pressure through the corresponding end of said pipe, and switch means for each controller effective when the handle of the controller is operated to a certain one of its positions for interrupting the corresponding circuit.

14. A vehicle brake and propulsion system comprising, in combination, a control pipe extending from end to end of the vehicle, a controller device having a rotary operating shaft, self-lapping valve means operated in response to rotary movement of the operating shaft for controlling the pressure in said pipe, a plurality of control circuits including a plurality of wires extending from end to end of the vehicle, a plurality of switch devices operative to open or closed position in accordance with the rotary position of said shaft for controlling the said circuits respectively, means operative on one of said circuits effective upon interruption thereof for causing a maximum reduction of pressure in said pipe independently of said self-lapping valve means, means controlled by the pressure in said pipe effective to cause release of the brakes when the said control pipe is charged to a certain pressure and operative in response to a reduction of the pressure in said pipe below said certain pressure for effecting application of the brakes, means operative on certain other of said circuits and effective to control the supply of propulsion power to the propulsion means of the vehicle, and means controlled according to the pressure in said control pipe and effective jointly with certain of said switch devices for controlling the circuits on which the last said means operates for causing cessation of propulsion when the pressure in said pipe is at said certain pressure and for causing propulsion of the vehicle when the pressure in said pipe is increased above said certain pressure.

ELLIS E. HEWITT.

CERTIFICATE OF CORRECTION.

Patent No. 2,215,356. September 17, 1940.

ELLIS E. HEWITT.

It is hereby certified that error appears in the printed specification of the above numbered patent requiring correction as follows: Page 26, second column, line 47, claim 7, for the word "brackets" read --brakes--; and that the said Letters Patent should be read with this correction therein that the same may conform to the record of the case in the Patent Office.

Signed and sealed this 10th day of December, A. D. 1940.

Seal)

Henry Van Arsdale,
Acting Commissioner of Patents.

CERTIFICATE OF CORRECTION.

Patent No. 2,215,356. September 17, 1940.

ELLIS E. HEWITT.

It is hereby certified that error appears in the printed specification of the above numbered patent requiring correction as follows: Page 26, second column, line 47, claim 7, for the word "brackets" read --brakes--; and that the said Letters Patent should be read with this correction therein that the same may conform to the record of the case in the Patent Office.

Signed and sealed this 10th day of December, A. D. 1940.

Henry Van Arsdale,
Seal) Acting Commissioner of Patents.